United States Patent [19]
Mahany

[11] Patent Number: 5,748,676
[45] Date of Patent: May 5, 1998

[54] NETWORK UTILIZING MODIFIED PREAMBLES THAT SUPPORT ANTENNA DIVERSITY

[75] Inventor: Ronald L. Mahany, Cedar Rapids, Iowa

[73] Assignee: Norand Corporation, Cedar Rapids, Iowa

[21] Appl. No.: 431,993

[22] Filed: May 1, 1995

[51] Int. Cl.$^6$ ............................. H04K 1/10; H04L 27/28
[52] U.S. Cl. .................. 375/260; 455/272; 455/277.1; 375/347
[58] Field of Search .......................... 375/260, 347; 455/272, 277.1

[56] References Cited

U.S. PATENT DOCUMENTS

| | | | |
|---|---|---|---|
| 4,538,153 | 8/1985 | Taga | 343/700 |
| 5,161,252 | 11/1992 | Higuchi et al. | 455/78 |
| 5,203,026 | 4/1993 | Ekelund | 455/134 |
| 5,241,701 | 8/1993 | Andoh | 455/272 |
| 5,369,801 | 11/1994 | Smith | 455/277.1 |

*Primary Examiner*—Stephen Chin
*Assistant Examiner*—Mohammad Ghayour
*Attorney, Agent, or Firm*—Stanford & Bennett,L.L.P.

[57] ABSTRACT

A network is disclosed which utilizes modified preambles in a communication network to facility antenna diversity and multipath compensation. In one embodiment, an antenna diversity protocol first directs a mobile transceiver to select any antenna that enables successful receipt and identification of at least a portion of the preamble, i.e., the selection of a satisfactory antenna. Once a satisfactory antenna is identified, the diversity protocol extracts from received portions of the preamble information necessary to determine whether there is enough preamble remaining to conduct a best antenna search. If so, the other antennas are sequentially selected to evaluate their performance. Thereafter, the diversity protocol directs the mobile transceiver to select the best antenna based on a performance comparison. If, however, the diversity protocol determines that there is not enough remaining preamble to conduct the best antenna search, the protocol directs the mobile transceiver to use the currently selected satisfactory antenna to receive the remainder of the communication packet. Providing an indication of remaining preamble, the preamble is either marked with at least one time stamp or contains at least two identifiably distinct preamble portions.

10 Claims, 10 Drawing Sheets

NETWORK UTILIZING MODIFIED PREAMBLES THAT SUPPORT ANTENNA DIVERSITY

BACKGROUND OF THE INVENTION

In typical radio data communication systems, each radio transceiver is configured for use with a single antenna. However, single antenna configurations often prove inadequate for maintaining wireless communication because of inherent antenna orientation and performance limitations. To solve such inadequacies, some radio transceivers have been configured with a second antenna having alternate orientation and/or performance characteristics. With two antennas, the transceiver can select one of the two antennas based on the receipt of incoming communications.

More specifically, in current dual antenna designs, the selection process (referred to hereinafter as an "antenna diversity protocol") involves the selection of either a best antenna or a satisfactory antenna. To select the best antenna, the transceiver listens to transmissions using the first antenna and then the second antenna. Thereafter, for further communication, the transceiver selects the antenna that yielded the best reception performance. In a satisfactory antenna diversity protocol, the transceiver first listens with the first antenna. If reception proves satisfactory, the transceiver selects the first antenna for further communication. Otherwise, the transceiver listens using the second antenna, and, with satisfactory reception, the second antenna is selected.

With single antenna configurations, a transceiver adds a specific preamble bit sequence to each packet of data to be transmitted. Knowing the specified preamble in advance, another transceiver that successfully receives such a transmission can easily detect and lock on to the preamble portion of the transmission. Having identified the preamble portion, a receiving transceiver can be fairly confident that it can successfully receive the subsequent information portion of the transmission. If instead the preamble cannot be discerned, a receiving transceiver concludes that it cannot reliably receive the subsequent data portion of the transmission.

To accommodate preamble identification, the preamble must be of such content and duration as to permit reliable identification by a receiving transceiver. For example, some current preambles consist of a "101010 . . . " bit pattern sequence, because such a sequence can be rapidly detected. Depending the specific sequence (the content), a transceiver will require a certain duration of time (i.e., a certain number of received preamble bits) to identify a preamble. Thus, if the preamble portion of the packet is made too short in duration, transceivers would not be able to make an accurate identification before the data portion of the transmission begins. If the preamble portion is too long, the overhead associated with sending the preamble becomes highly undesirable due to the inherent decrease in data transmission throughput. Additionally, longer overall packet size (caused by longer preamble lengths) leads to a higher likelihood of reception failure. In many system protocols a longer preamble increases the chances for collisions between two or more units competing with the channel. Thus, the preamble portion of the packet must be of only such duration as to permit reliable preamble identification by the transceivers.

To accommodate best or satisfactory diversity protocols, transceivers have been configured to perform their antenna selection during the preamble portion of a transmitted packet. Unlike single antenna configurations, however, transceivers having multiple antennas must be capable of identifying the preamble of a transmission a plurality of times.

For example, using the best antenna diversity protocol, a transceiver having access to two antennas must first attempt to identify the preamble with the currently selected antenna. After either identifying or failing to identify the preamble, the transceiver switches to the other antenna to also attempt to identify the preamble. If the transceiver fails to identify the preamble with either antenna, the transceiver does not attempt to receive the data portion of the transmission because of reliability concerns.

If only one of the two antennas yielded a satisfactory identification of the preamble, the transceiver utilizes that antenna (the "successful antenna") to attempt to receive the subsequent data portion of the transmission. If the successful antenna happened to be the one currently selected, the transceiver merely listens for the end of the preamble and beginning of data. However, if the successful antenna happened to be the previously selected antenna, the transceiver must switch antennas and re-identify the preamble before the data begins. Otherwise, the transceiver cannot count on reliable receipt of the data portion of the transmission.

If both of the antennas yield a satisfactory identification of the preamble, the transceiver selects that antenna which exhibits the best signal quality (the "best antenna"). This may also require that the transceiver switch antennas and re-identify the preamble if the best antenna is not currently selected.

Thus, using the best antenna diversity protocol with two antennas, to accommodate worst case scenarios, the preamble must be about three times longer in duration than that necessary for a single antenna, i.e., three time periods for preamble identification attempts (hereinafter "observation windows") plus two antenna switching time periods.

Similarly, to support the worst case scenario, the satisfactory antenna diversity protocol using two antennas requires a preamble of about two times the duration of that needed for single antenna configuration. Specifically, where the first antenna cannot satisfactorily identify the preamble, the preamble length must include: 1) a first time period for attempting to identify the preamble with the first antenna (a "first observation window"); 2) a second time period during which the transceiver switches to the second antenna; and 3) a third time period for attempting to identify the preamble with the second antenna (a "second observation window").

Causing further problems for the diversity protocols, transceivers occasionally miss the beginning of a preamble period, and, therefore, unexpectedly encounter the end of the preamble and beginning of the data. Often this unexpected encounter results in the diversity protocol's failure to complete the antenna selection process within the remaining preamble time period, resulting in a lost transmission. Factors causing a transceiver to miss the beginning portion of a preamble include: 1) collisions with another transmission; 2) other types of interference or noise; or 3) an inopportune beginning of reception after the start of the preamble transmission.

Because transceivers do not detect that they have missed part of the preamble, they may invoke a diversity protocol that is destined to fail. Best antenna diversity protocols are extremely vulnerable in such situations, frequently missing transmissions that a single antenna systems would receive.

Although the satisfactory antenna diversity protocol provides the most immunity to an unexpected preamble end, the satisfactory protocol does not always use the "best" antenna available for a given communication. As a result, transmission failures after successful antenna selection are more likely to occur with the satisfactory protocol than with a best antenna diversity protocol.

In addition, many current transceivers implement various forms of multipath compensation (also referred to herein as "adaptive equalization") using the preamble. As with diversity protocols, each multipath compensation technique requires a certain duration of preamble for successful application, with some (typically better) techniques taking much longer than others. If the beginning of a preamble is missed, such techniques fail upon encountering an unexpected end of the preamble.

Factors for selecting a preamble bit sequence to provide optimal adaptive equalization often conflict with factors for providing rapid preamble identification. Thus, in current preamble bit sequences, compromises are made. As a result, either the ease of preamble identification or adaptive equalization or both suffer.

More specifically, IEEE 802.11 compatible communication networks provide a preamble of a duration proposed to be sufficient to support antenna diversity and multipath compensation. The specified preamble bit sequence (or preamble content) consists of a known uniform sequence. For example, a "dotting pattern" of 1-0-1-0 . . . is specified for Frequency Hopping (FH) communication, and a "marking pattern" of 1-1-1-1 . . . is specified for Direct Sequence (DS) communication. Both of these simple bit sequence patterns have been selected because they are easily recognized by transceivers as the preamble. More complex sequences having longer-repeating or non-repeatable bit patterns are much harder to recognize. However, neither of these bit sequence patterns provide an indication of the beginning of a preamble or warn of a preamble end.

With the currently specified uniform preamble sequence, a receiver, attempting to identify the preamble for the first time, has no knowledge of whether it has synchronized to the first bits of the preamble, the center, or the end. Therefore, the worst possible timing relationship between start of transmission and antenna sampling must be assumed in designing a diversity protocol. For example, to support two antennas, the best antenna protocol requires only two or three observation periods to make a decision. Even so, to accommodate at least a percentage of worst case scenarios (wherein the beginning of the preamble has been missed), five of such observation periods might be included in the preamble length. Yet where antenna scanning and start of transmission happen to coincide, the last two or three periods would constitute unnecessary overhead. The timely receiver is forced to wait through such periods not knowing when to expect the preamble end.

Moreover, the subject of antenna selection has been discussed in detail in a recent paper entitled "Carrier Sense with Diversity Modifier FH PHY" by Dean Kawaguchi, IEEE P802.11-94/70, March 1994. Kawaguchi discloses methods for performing two-antenna selection diversity, but does not consider alternatives such as n antenna selection diversity, adaptive equalization, maximum ratio combining, or RAKE approaches for direct sequence. All of these techniques generally benefit from training during the preamble period, and all are subject to the aforementioned limitations faced by antenna diversity and multipath compensation protocols.

Therefore, an object of the present invention is to provide transceivers in a wireless communication network with the capability of optimally using a preamble of minimal duration for all preamble purposes.

It is a further object of the present invention to provide an optimal "n" antenna diversity protocol which does not suffer from unnecessary preamble overhead, and which implements the advantages of both the satisfactory and best antenna diversity protocols.

It is another object of the present invention to prevent a transceiver from encountering an unexpected end of a preamble, regardless of whether the beginning of a preamble transmission has been missed.

Another object of the present invention is to inform transceivers of their location in the preamble so that they can most appropriately select from their available antennas without unexpectedly encountering a preamble end.

Still other objects of the present invention will become apparent with further reference to the remaining specification, claims and related figures.

SUMMARY OF THE INVENTION

These and other objects of the invention are achieved in a method for use in a communication network having a transmitter and a receiver. The receiver has a plurality of antennas, and the transmitter and receiver use a preamble of a communication packet to facilitate an antenna diversity protocol in the receiver. The method comprises the steps of first transmitting by the transmitter a first bit sequence of the preamble. Next, the transmitter transmits a time stamp bit sequence of the preamble where the time stamp bit sequence is identifiably distinct from the first bit sequence of the preamble and where the time stamp bit sequence of the preamble is identifiable by a receiver for use in an antenna diversity protocol. The transmitter then transmits a second bit sequence of the preamble and the remainder of the communication packet.

In another embodiment, after the transmitter transmits the time stamp bit sequence of the preamble, the receiver attempts to select a best antenna from the plurality of antennas for receipt of the remainder of the communication packet if the time stamp bit sequence is successfully received by the receiver.

In a further embodiment, the method comprises the steps of first beginning to transmit, by the transmitter, a first bit sequence of a preamble, the first bit sequence being identifiable by a receiver for use in an antenna diversity protocol. After transmission of the first bit sequence has ended, the transmitter begins to transmit, a second bit sequence of the preamble, the second bit sequence of the preamble identifiably distinct from the first bit sequence of the preamble, the second bit sequence being identifiable by a receiver for use in the antenna diversity protocol. After transmission of the second bit sequence has ended, the transmitter transmits the remainder of the communication packet.

In another embodiment, after the step of beginning to transmit by the transmitter a first bit sequence of a preamble, the receiver attempts to select a best antenna from the plurality of antennas for receipt of the remainder of the communication packet if the first bit sequence is successfully identified by the receiver.

In a still further embodiment, after the step of beginning to transmit by the transmitter a second bit sequence of the preamble, the receiver accepts a satisfactory antenna from the plurality of antennas for receipt of the remainder of the communication packet if the first bit sequence is not successfully identified by the receiver.

In yet another embodiment, the method comprises the steps of selecting and beginning to transmit, by the transmitter, a first of a plurality of preamble portions, each preamble portion being distinguishable from the other of the plurality of preamble portions by a receiver for use in an antenna diversity protocol. After transmission of the selected preamble portion, the transmitter selects and begins to transmit another one of the plurality of preamble portions. The transmitter repeats this step if other of the plurality of preamble portions have not yet been transmitted. Then, the transmitter transmits the remainder of the communication packet.

In another embodiment, after the step of selecting and transmitting by the transmitter one of a plurality of preamble portions, the receiver attempts to select a best antenna from the plurality of antennas for receipt of the remainder of the communication packet if the first preamble portion transmitted is successfully identified by the receiver.

In a still further embodiment, the receiver uses an observation window to carry out the antenna diversity protocol, and, after the step of selecting and transmitting by the transmitter one of a plurality of preamble portions, the receiver lengthens the observation window for use in the antenna diversity protocol if the first preamble portion transmitted is successfully identified by the receiver.

In yet another embodiment, after the step of selecting and beginning to transmit by the transmitter another one of the preamble portions, the receiver begins to perform adaptive equalization if the antenna diversity protocol has completed antenna selection.

In another embodiment, after the step of selecting and beginning to transmit by the transmitter another one of the preamble portions, the receiver accepts a satisfactory antenna from the plurality of antennas for receipt of the remainder of the communication packet if both the selected one of the preamble portions is the last of the plurality of preamble portions to be transmitted, and no previously transmitted preamble portions were successfully identified by the receiver.

The full details of the subject invention will become apparent from the following detailed description taken in conjunction with the drawings and claims.

DETAILED DESCRIPTION OF THE INVENTION

Figure 1:
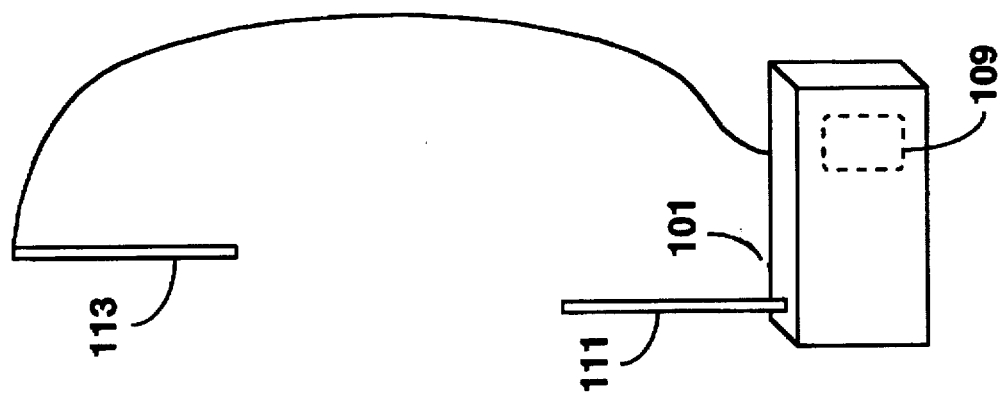
FIG. 1 is a perspective diagram illustrating a radio communication network wherein radio transceivers utilize multiple antennas and a diversity protocol in accordance with one embodiment of the present invention.
Figure 1:
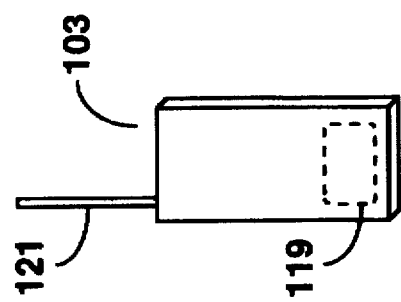
Figure 1:
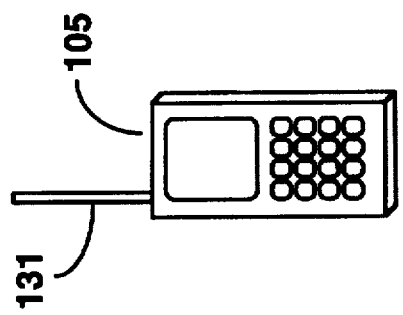

FIG. 1 is a perspective diagram illustrating a radio communication network wherein radio transceivers utilize multiple antennas and a diversity protocol in accordance with one embodiment of the present invention. In particular, a stationary transceiver 101 communicates via radio frequency (RF) transmissions with mobile transceivers 103 and 105. The mobile transceivers 103 and 105 may communicate with each other either directly, or indirectly through the stationary transceiver 101. The mobile transceivers 103 and 105 might be hand-held, vehicle mounted units, etc.

As illustrated, the stationary transceiver 101 utilizes either an internal loop antenna 109, an attached monopole antenna 111, or a remote monopole antenna 113. Similarly, the mobile transceiver 103 utilizes an internal loop antenna 119 or an attached monopole antenna 121. The mobile transceiver 105 only has an attached monopole antenna 131. Additional or alternate antenna configurations for any of the transceivers might also be implemented.

To communicate, the stationary transceiver 101 selects one of the antennas 109, 111 or 113, and begins transmitting a communication packet to, for example, the mobile transceiver 103. The stationary transceiver 101 selects the antenna based on whichever antenna was previously used to conducting a successful communication exchange with the intended destination, i.e., in this example the mobile station 103. The communication packet contains a preamble followed by data, instructions and/or other information destined for the mobile transceiver 103.

In response and in accordance with an antenna diversity protocol, the mobile transceiver 103 attempts to select an antenna to receive the communication packet. The antenna diversity protocol of the mobile transceiver 103 exhibits a preference toward the selection of the antenna capable of receiving the communication packet with the greatest signal quality (i.e., toward selecting the "best antenna"). However, if the diversity protocol concludes that selection of a best antenna is not likely to be possible, the first antenna that seems capable of receiving the communication packet is selected to receive the communication packet.

More specifically, to facilitate the antenna diversity, the preamble of each communication packet is used by the receiver portion of the mobile transceiver 103 to carry out the antenna diversity protocol. The stationary transceiver 101 subdivides the preamble into a plurality of preamble portions for successive transmission to the mobile transceiver 103. By extracting information from whatever part of the successively transmitted plurality of preamble portions that is actually received, the mobile transceiver 103 can determine whether to attempt to identify a best antenna or to merely accept a satisfactory antenna.

For example, in one embodiment, the antenna diversity protocol first directs the mobile transceiver 103 to select any antenna that enables successful receipt and identification of at least a portion of the preamble, i.e., the selection of a satisfactory antenna. Once a satisfactory antenna is identified, the diversity protocol extracts from received portions of the preamble information necessary to determine whether there is enough preamble remaining to conduct a best antenna search. If so, the other antennas are sequentially selected to evaluate their performance. Thereafter, the diversity protocol directs the mobile transceiver 103 to select the best antenna based on a performance comparison. If, however, the diversity protocol determines that there is not enough remaining preamble to conduct the best antenna search, the protocol directs the mobile transceiver 103 to use the currently selected satisfactory antenna to receive the remainder of the communication packet.

Although FIG. 1 illustrates a specific embodiment using mobile and stationary transceivers, any other combination of mobile transceivers or stationary transceivers or both might alternately be used with the present invention. In addition, the stationary transceiver 101 might also constitute a relay point, data base server and/or access point to another wireless or wired network. Similarly, the mobile transceivers 103 and 105 might be electrically connected via PCMCIA slots to be combined with computer terminals or tablets, for example. Moreover, as mentioned hereinafter, the term "receiver" refers to both a separate receiver only device as well as a transceiver utilizing the receiver portion of the transceiver circuitry (see for example, FIG. 10). Similarly, the term "transmitter" refers to either a transmit only device as well as transmitter circuitry of a transceiver.

Figure 2:
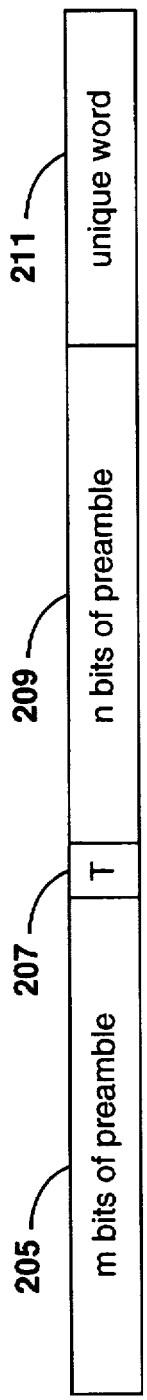
FIG. 2 is a diagram which illustrates a generic embodiment of a preamble bit sequence having a single time stamp for use with the antenna diversity protocol of the radio communication network of FIG. 1.

FIG. 2 is a diagram which illustrates a first generic embodiment of a preamble bit sequence having a single time stamp for use with the antenna diversity protocol of the radio communication network of FIG. 1. In this generic embodiment, a preamble 201 consists of, in sequence, m bits of preamble 205, a time stamp bit sequence 207, n bits of preamble 209, and a unique word 211. All communication packets transmitted by transceivers in the network contain this preamble 201 followed by the actual information to be communicated, i.e., the data, instructions or other content intended to be communicated. Thus, as previously mentioned, the preamble 201 constitutes overhead.

The length of the m bits of preamble 205 is preselected to provide sufficient time for a receiver to successfully identify a satisfactory antenna at least some margin before encountering the time stamp 207. Thereafter, using the satisfactory antenna, the receiver listens for the time stamp 207. If the time stamp 207 is detected, the receiver concludes that it has sufficient time remaining, i.e., the duration associated with the n bits of preamble 209, to conduct a best antenna search.

In addition, non-configured receivers (i.e., receivers which are not configured to identify either the time stamp 207 or the m bits of preamble 205, but which are configured to identify the n bits of preamble 209 and the unique word 211) cannot identify the content of fields 205 and 207, and, therefore, will effectively ignore them. Instead, the non-configured receivers only detect the latter portion of the extended preamble 201, and does not know whether the preamble has been extended or not. Thus, with either the extended or the non-extended preamble, the non-configured receivers merely identifies a satisfactory antenna in the field 209, identifies the unique word in the field 211, and receives the subsequent communication packet content.

Figure 3:
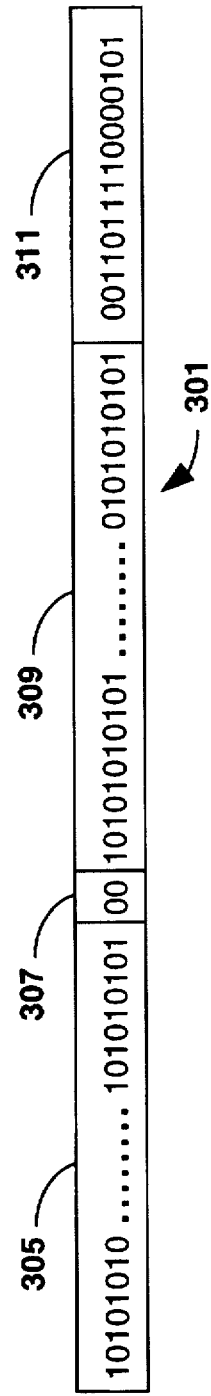
FIG. 3 is a diagram which illustrates a specific embodiment of the preamble bit sequence of FIG. 2 which utilizes the single time stamp.

FIG. 3 is a diagram which illustrates a more specific embodiment of the preamble bit sequence of FIG. 2 which utilizes the single time stamp. Initially, using the satisfactory antenna selection process defined by an antenna diversity protocol controlling a receiver, the receiver selects a first antenna and uses it to attempt to identify the preamble bit sequence "1010 . . . ", as is contained in either an m bits of preamble field 305 or an n bits of preamble field 309. If the bit sequence is successfully identified with sufficient signal quality and duration, the receiver concludes that it has found a satisfactory antenna.

Alternately, if, when using the first antenna, the receiver fails to identify the bit sequence "1010 . . . " with sufficient signal quality and duration, the receiver switches to a next antenna to attempt the identification. The switching and failed identification process continues until an antenna is located which successfully identifies the bit sequence with sufficient signal quality. The antenna leading to such success is the satisfactory antenna.

At this point, although a satisfactory antenna has been identified, the receiver cannot be sure whether the identified bit sequence occurred within the preamble field 305 or within the preamble field 309. The receiver cannot be sure because the transceiver may have failed to receive the entire first portion of the preamble well into the preamble field 309. As previously mentioned, such a failure might have been due to: 1) collisions with noise or another transmission; 2) unacceptable signal strength; 3) multipath collisions; or 4) a receiver's inopportune beginning to listen, e.g., upon powering up the receiver after a random power down period to save power.

Thus, because the receiver cannot be sure whether the identified bit sequence occurred within field 305 or within field 309, the receiver begins to wait for either the time stamp "00" (as is contained in a time stamp field 307) or the unique word "0011 0111 1000 0101" (as is contained in a unique word field 311). If the receiver detects the time stamp, the antenna diversity protocol concludes that the n bits of preamble in field 309 provide a sufficient time to conduct a best antenna search. Therefore, the receiver begins cycling through the remaining antennas to attempt to identify the best antenna. Having selected the best antenna, the receiver monitors the remaining transmission of the content of the preamble field 309 to identify the transmission of the unique word in the field 311. The unique word signals the beginning of the remaining portion of the communication packet, i.e., the actual content of the communication.

Alternately, if while waiting for either the time stamp or the unique word the receiver detects the unique word, the receiver concludes that there is no time for a best antenna search because the actual content (data, instructions and/or other information) of the communication packet is going to begin. Instead, the receiver retains the satisfactory antenna to receive the remaining portion of the communication packet.

Additionally, the receiver can easily detect the time stamp "00" by simple pattern recognition circuits keyed to sequential bits "1001" or "010010", for example. Further detail regarding this process is provided below in reference to FIG. 10.

Moreover, the illustrated preamble of FIG. 3 represents minimal departure from a commonly used frequency hopping (FH) dotting pattern preamble, with the departure being the addition of the time stamp in field 307. As such, the illustrated preamble provides an viable alternative to current FH preambles with minimal change in existing hardware and software.

Figure 4:
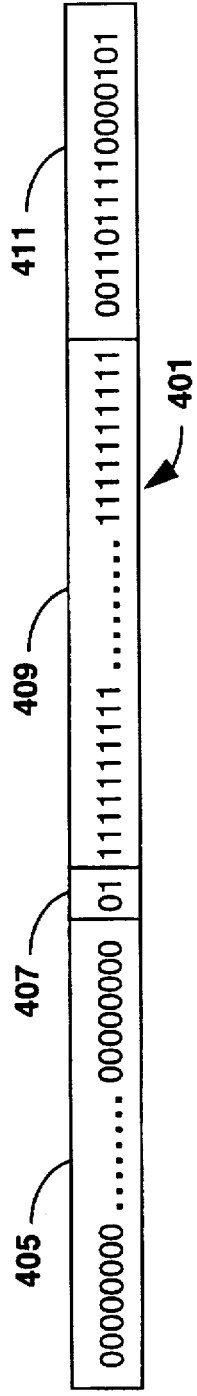
FIG. 4 is a diagram which illustrates an alternate embodiment of the preamble bit sequence of FIG. 2 which can also automatically distinguish the first from the second preamble field whether or not the time stamp has been detected.

FIG. 4 is a diagram which illustrates an alternate embodiment of the preamble bit sequence of FIG. 2 wherein the content of the first preamble field can be easily distinguished from the second preamble field whether or not a time stamp has been detected. More specifically, to utilize the illustrated preamble embodiment, receivers in the network are configured with two pattern recognition circuits, one keyed to the first preamble portion 405 ("0000") and the other keyed to the second preamble portion 409 (i.e., "1111"). As such, the actual time stamp "01" does not require an independent recognition circuit, as becomes apparent when considering the operation of the diversity protocol of FIG. 4.

In particular, the receiver first sequences through its available antennas until an antenna is identified that can satisfactorily detect the bit sequence within either the field 405 or within the field 409. The receiver accomplishes such detection using the corresponding recognition circuits, operating in parallel to simultaneously look for the either preamble sequence. In addition, the proposed preamble sequences in fields 405 and 409 are proposed for use in a direct sequence (DS) spread spectrum transceiver environment, wherein the preamble would be scrambled using a known spreading code to provide spectral whitening. Thus, the receiver uses the spreading code in conjunction with the recognition circuits to identify the illustrated preamble bit sequences.

As soon as the receiver identifies the satisfactory antenna, the receiver immediately determines whether the preamble transmission is still within the field 405 or within the field 409. This is possible because the receiver merely checks to see which recognition circuit proved to be successful in identifying the satisfactory antenna. Thereafter, as previously described, the receiver can appropriately determine whether to attempt the best antenna search or not. In particular, only if the receiver identifies a satisfactory antenna while still somewhere within the preamble field 405 will the receiver begin the best antenna search.

Note that unlike the embodiment illustrated in FIG. 3, the receiver need not wait until the time stamp (or the beginning of the field 409) is detected to begin the best antenna search, although it could be configured to do so, if so desired. In addition, although not shown, the time stamp bit sequence 407 might also be selected so as to be completely different from the two unique preamble fields 405 and 409, if so desired. Correspondingly, a recognition circuit to identify such a time stamp could also be incorporated so as to immediately trigger the best antenna search if such a design proves viable for a particular solution.

Figure 5:
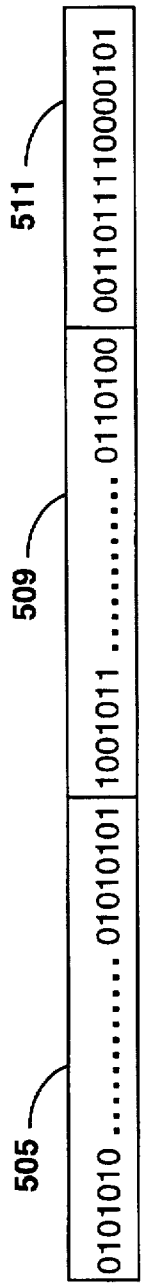
FIG. 5 is a diagram which illustrates another embodiment of the preamble bit sequence of FIG. 2 which also automatically distinguish the first from the second preamble field, and wherein the first field bit sequence is designed for rapid synchronization while the second is selected for optimizing multipath compensation.

FIG. 5 is a diagram which illustrates another embodiment of the preamble bit sequence of FIG. 2 which automatically distinguish the first from the second preamble field, and wherein the first field bit sequence is designed for rapid synchronization while the second is selected for optimizing multipath compensation. As previously mentioned, the preamble can be used for more than one purpose. Two exemplary purposes, of course, include antenna diversity and multipath compensation. For antenna diversity, rapid identification of preamble bit sequence proves to be a significant factor for defining a bit sequence. Thus, a short, repeatable pattern such as "010101 . . . " proves to be highly desirable for such purposes. The longer the pattern, the longer the identification process.

Similarly, factors exist which can aid the multipath compensation process by choosing an appropriate preamble bit pattern. In particular, to accommodate multipath compensation, auto-correlation techniques are used to construct filters (herein referred to as "adaptive filters") which attempt to minimize multipath interference, e.g., interference between a transmission taking a more direct path to the receiver and the same transmission which reaches a receiver at some time delay thereafter along an alternate, less direct pathway. Thus, to choose an appropriate preamble bit pattern to optimize multipath compensation, a bit pattern with good correlation properties should be chosen, such as any of the shorter length barker codes. An exemplary sequence illustrated in FIG. 5 involves the sequence "1001010" followed by the inverted form "0110101", which forms an overall fourteen bit, repeatable pattern.

To accommodate both multipath compensation and antenna diversity, a portion of the preamble is allocated to optimize one while another portion is allocated to optimize the other. Specifically, in a first portion of the preamble in a field 505, the preamble bit sequence is defined for rapid preamble detection, while in a second portion of the preamble in a field 509, a bit pattern attempting to optimize multipath compensation selected.

As previously described, a receiver begins by identifying a satisfactory antenna using two recognition circuits—one for the sequence in the field 505 and one for the sequence in the field 509. If the satisfactory antenna is located while receiving the contents of the field 505, the receiver immediately begins a best antenna search which may or may not span into the field 509. Once the best antenna is identified and selected, the receiver performs adaptive filtering to minimize multipath interference using the remaining bit sequence in the field 509.

Figure 6:
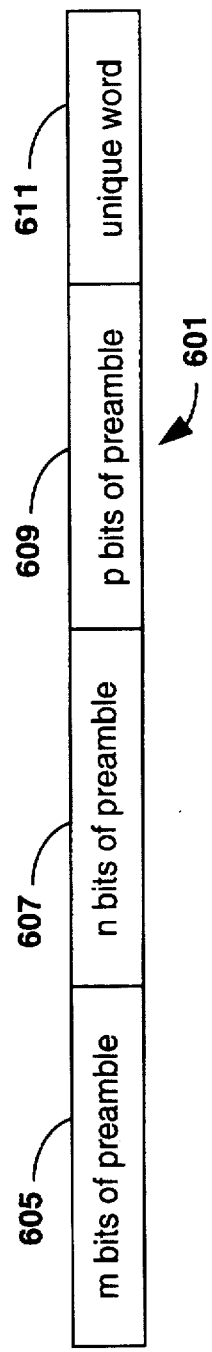
FIG. 6 is a diagram which illustrates an alternate generic embodiment of a preamble bit sequence that uses a plurality of preamble fields to optimize antenna diversity and multipath compensation in the radio communication network of FIG. 1.

FIG. 6 is a diagram of an alternate generic embodiment of a preamble bit sequence that illustrates the use of a plurality of preamble fields to optimize antenna diversity and multipath compensation in the radio communication network of FIG. 1. With the plurality of fields, the diversity protocol has better feedback as to the remaining preamble, and, thus, can select a diversity and multipath compensation sequence tailored to optimize the available preamble in case a portion of the transmitted preamble happens to be missed. However, to identify the content of each of fields 605, 607 and 609, corresponding recognition circuits that operate in parallel must be added to the receiver. In addition, although only three fields are shown, more might be added along with appropriate corresponding recognition circuitry as proves necessary or desirable.

Figure 7:
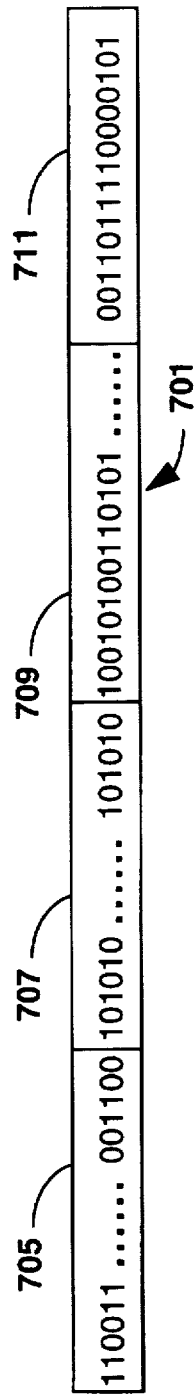
FIG. 7 is a diagram which illustrates a specific embodiment of a preamble bit sequence of FIG. 6 that provides for a distinguishable synchronization pattern in the first field, a rapid synchronization pattern in the second field, and an optimal multipath compensation pattern in the third field.

FIG. 7 is a diagram which illustrates a specific embodiment of a preamble bit sequence of FIG. 6 that provides for a distinguishable synchronization pattern in the first field, a rapid synchronization pattern in the second field, and an optimal multipath compensation pattern in the third field. A more detailed flow chart representation of the antenna diversity protocol can be found below in reference to FIGS. 9a-c.

Figure 8A:
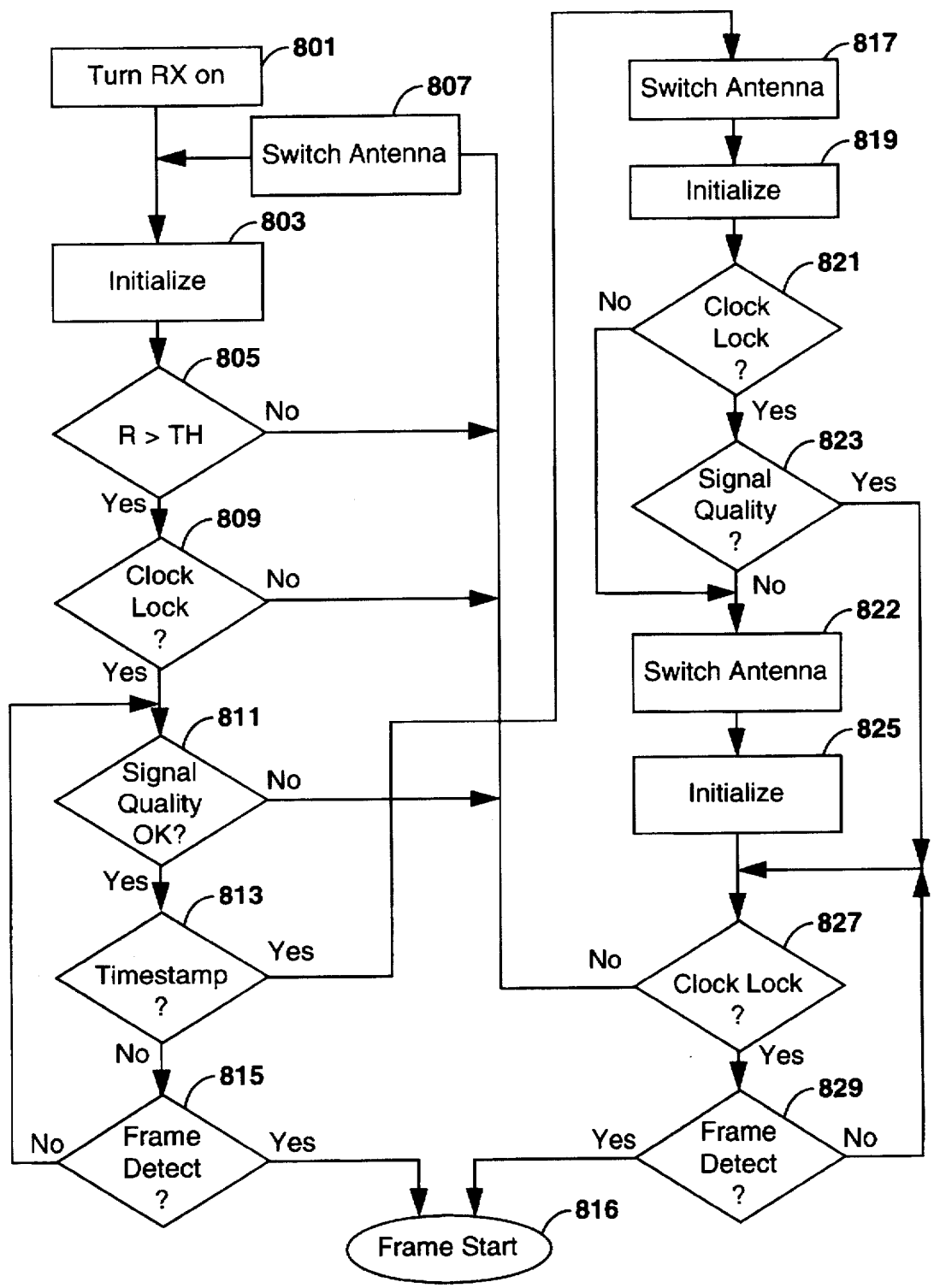
FIG. 8a is a flow diagram illustrating the functionality of the antenna diversity protocol executed by the transceivers of FIG. 1 when using a single time stamp preamble of FIG. 3.

FIG. 8a is a flow diagram illustrating the functionality of one embodiment of the antenna diversity protocol executed by the transceivers of FIG. 1 when using a single time stamp preamble of FIG. 3. The receiver may initially be in a low power consuming, or sleep, mode to conserve battery power. The receiver is first turned on at a block 801, and performs an initialization process at a block 803. Until the receiver receives a signal that is greater than a received signal strength (RSSI) threshold at a block 805, the receiver repeatedly switches antennas at a block 807, performs the initialization process at block 803, and performs the threshold test at block 805.

When the RSSI is greater than the threshold, the receiver will still switch antennas at block 807 and loop until the receiver finds an antenna capable of meeting the threshold requirement and permitting clock lock with the preamble at a block 809. When clock lock is achieved, the receiver will again switch antennas at block 807 and loop until the received signal quality is determined to be satisfactory at a block 811. In other words, the receiver will continuously switch back and forth between antennas until the receiver is able to identify a satisfactory antenna.

When a satisfactory antenna is identified, the receiver, using recognition processing circuitry, listens for either a time stamp in the preamble period at a block 813 or a frame detect indication at a block 815. If the receiver happened to identify the satisfactory antenna after the time stamp occurred, the receiver, using the satisfactory antenna, will detect a start of frame indication, i.e. a unique word, at block 815. If a frame is detected, the receiver initiates normal frame reception at a block 816 using the satisfactory antenna to receive the communication packet content. If a frame is not detected, the receiver monitors the preamble signal quality (loops back to block 811) using the satisfactory antenna to determine whether the antenna is still satisfactory. If it is not satisfactory, the receiver switches antennas at block 807 and repeats the process.

When a time stamp is received at block 813, the receiver switches antennas at a block 817 to attempt to determine whether the other (i.e., second) antenna is better. After an initialization process at block 819, the receiver attempts to achieve preamble clock lock using the second antenna at a block 821. If clock lock is not achieved at block 821, the receiver again switches back to the first, or satisfactory, antenna at a block 822, goes through an initialization process at a block 825, and determines whether it still has preamble clock lock at a block 827. If clock lock remains, the receiver uses the first, or satisfactory, antenna to detect a frame at block 829.

If preamble clock lock is achieved using the second antenna at block 821, the receiver tests the preamble signal quality using the second antenna at a block 823. If the second antenna signal quality is greater than that of the first, or satisfactory, antenna, the receiver determines whether it still has preamble clock lock using the second antenna at a block 827, and, if it does, it uses the second antenna to attempt to detect a frame at a block 829. If the second antenna signal quality is not greater than that of the first, the receiver switches back to the first, or best antenna at block 822 and proceeds as described above.

If at any point a frame is detected at block 829, the receiver initiates normal frame reception using whichever antenna is selected. If a frame is not detected at block 829, the receiver again determines whether it still has preamble clock lock using the selected antenna at block 827. If at any point the receiver no longer has preamble clock lock at block 827 using the selected antenna, the receiver switches antennas at block 807 and repeats the whole process to determine a satisfactory antenna.

Figure 8B:
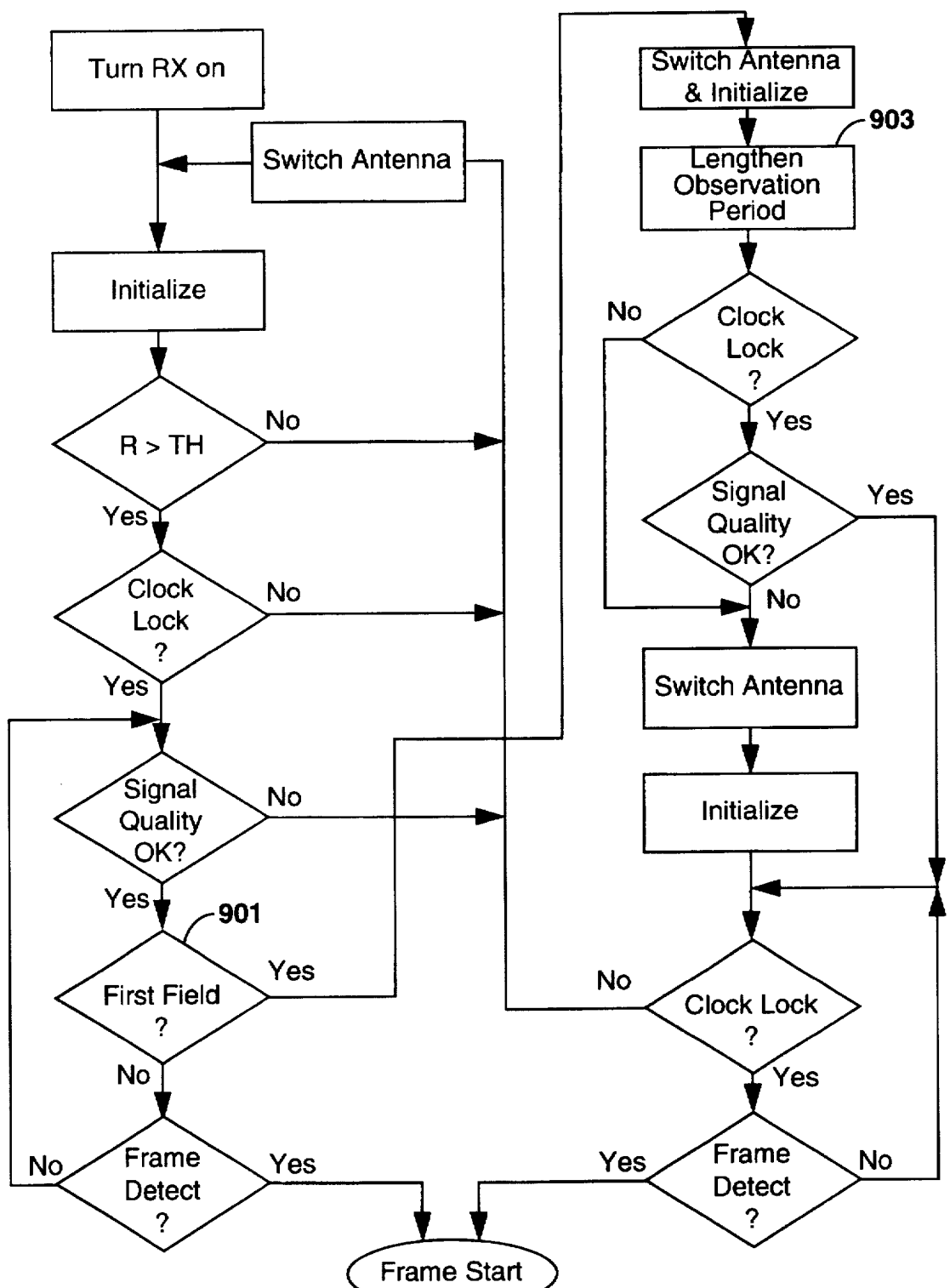
FIG. 8b is a flow diagram illustrating the functionality of the antenna diversity protocol executed by the transceivers of FIG. 1 when using automatic field identification as specified in the preamble of FIGS. 4-5.

FIG. 8b is a flow diagram illustrating the functionality of the antenna diversity protocol executed by the transceivers of FIG. 1 when using automatic field identification as specified in the preamble of FIGS. 4 and 5. The functionality of the protocol of FIG. 8b corresponds to that of FIG. a discussed above except that the receiver, rather than listening for a time stamp at a block 901 after it has selected a satisfactory antenna, contains detection circuitry (recognition processing circuitry) to determine whether or not the preamble is in its first field. If the first field is detected, the receiver switches antennas and attempts to determine whether the other antenna is better, as discussed above. However, in this case, at a block 903, because the receiver has more time, the receiver lengthens the observation period, i.e., the time the receiver spends evaluating a given antenna's performance.

Figure 9A:
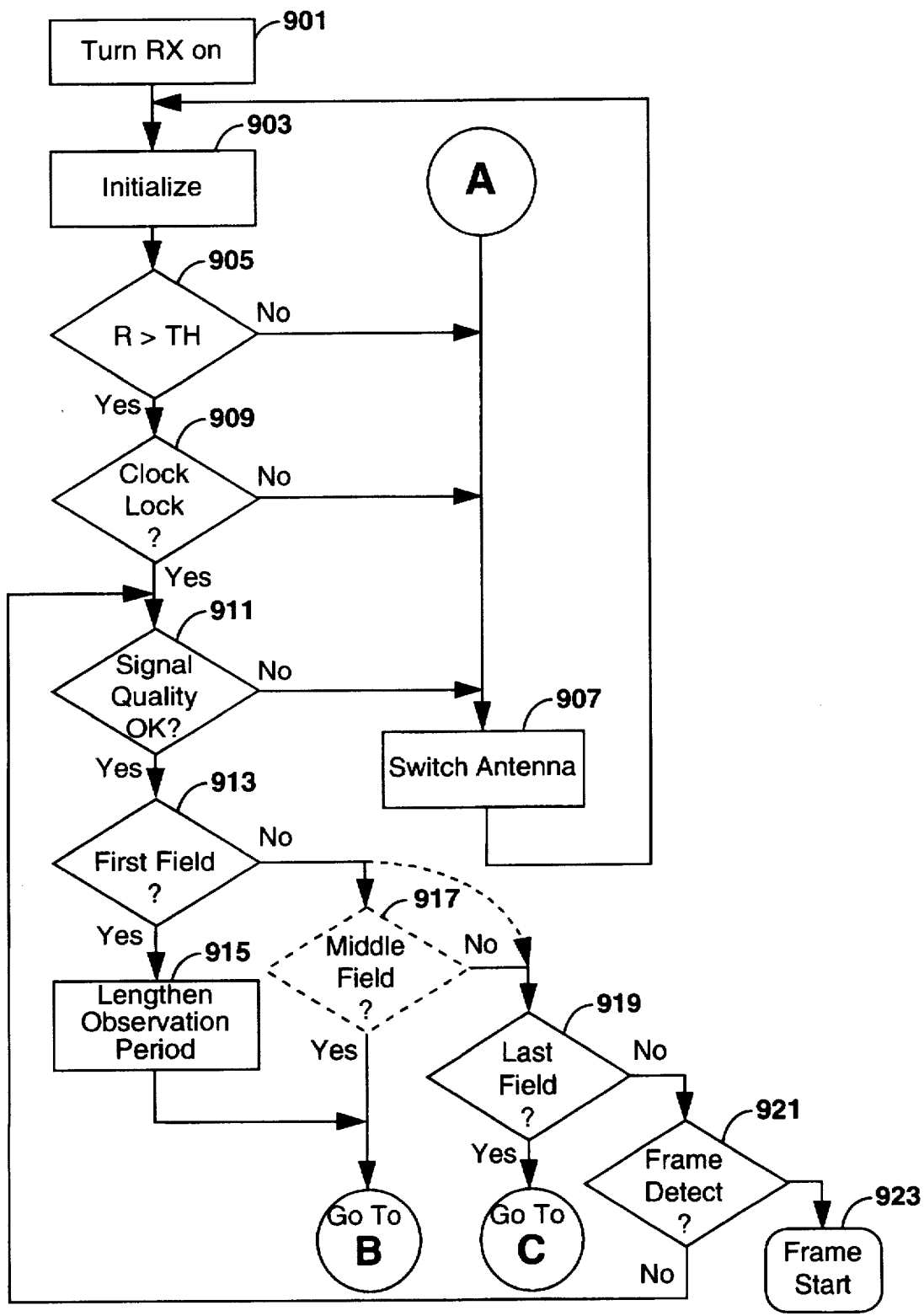
FIGS. 9a-c are a flow diagrams illustrating the functionality of the antenna diversity protocol executed by the transceivers of FIG. 1 when using the multiple field preamble of FIGS. 6-7.
Figure 9B:
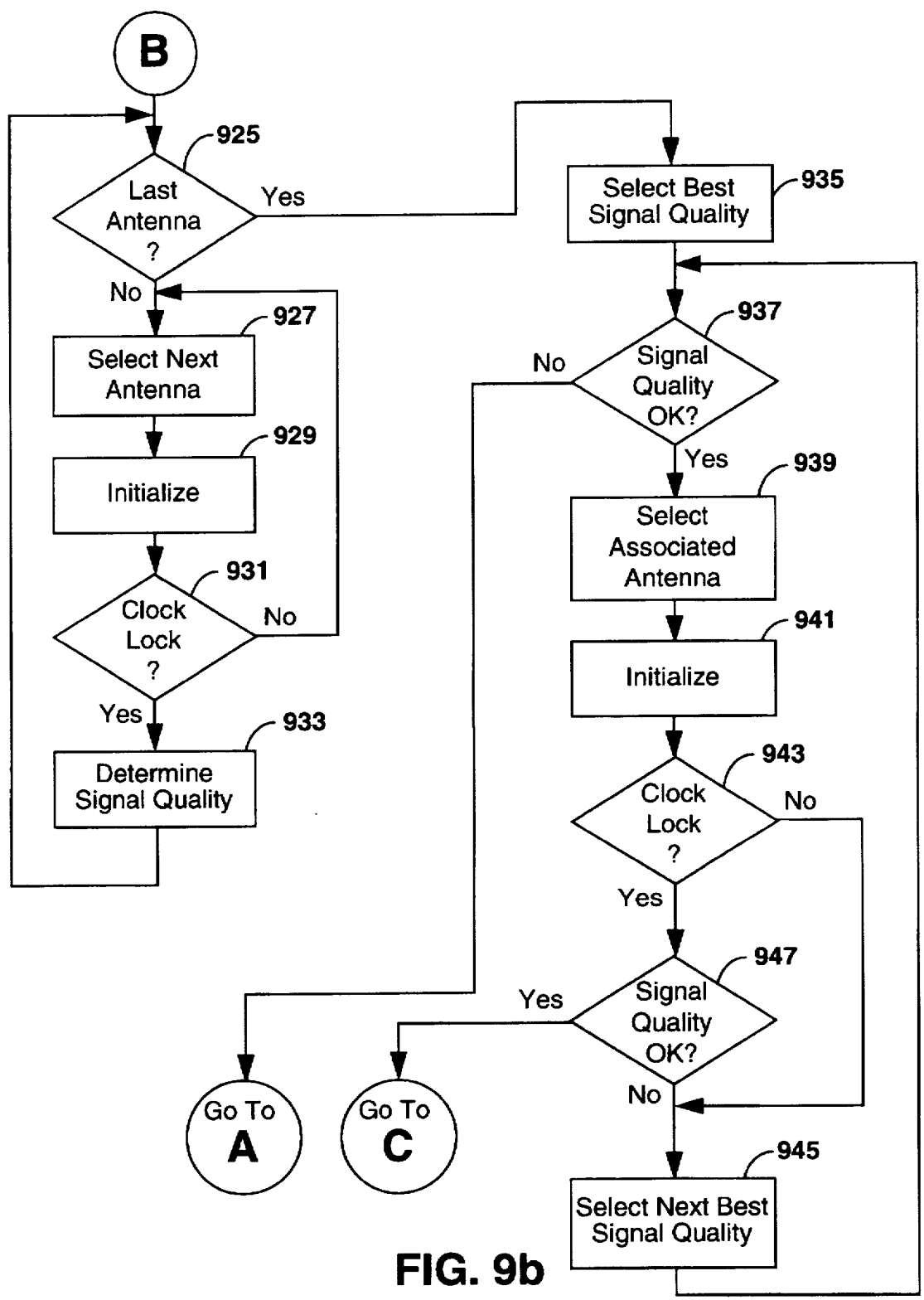
Figure 9C:
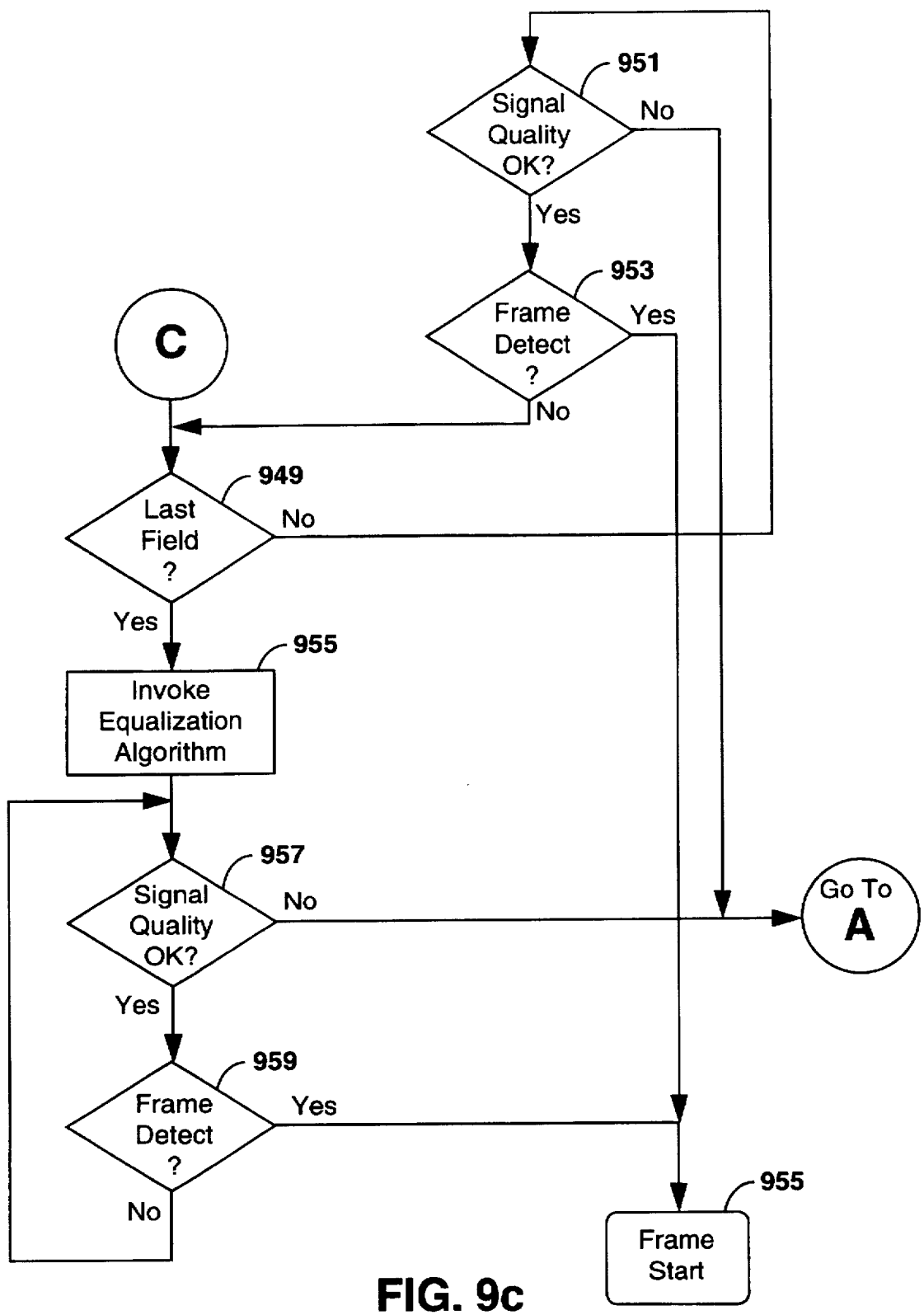

FIGS. 9a-c are a flow diagram illustrating the functionality of the antenna diversity protocol executed by the transceivers of FIG. 1 when using the multiple field preamble of FIGS. 6 and 7. The receiver is first turned on at a block 901, and performs an initialization process at a block 903. Until the receiver receives a signal that is greater than a RSSI threshold at a block 905, the receiver switches antennas at a block 907 and performs the initialization process at block 903. When the RSSI is greater than the threshold, the receiver will still switch antennas at block 907 and loop until the receiver achieves clock lock with the preamble at a block 909. When clock lock is achieved, the receiver will again switch antennas at block 807 and loop until the preamble signal quality is determined to be satisfactory at a block 911.

After a satisfactory antenna is selected, the receiver determines at a block 913 whether or not the preamble is in its first field. If it is, the receiver lengthens the observation period at a block 915 and goes to B to determine the best antenna. If the preamble is not in its first field, the receiver determines at a block 917 whether or not the preamble is in its middle field (optional). If it is, the receiver goes to B to determine the best antenna. If the preamble is not in its middle field, or if a middle field does not exist, the receiver determines at a block 919 whether or not the preamble is in its last field. If it is, the receiver goes to C to invoke an equalization algorithm. If the preamble is not in its last field at block 919, the receiver attempts to detect a frame at a block 921 using the selected satisfactory antenna. If a frame is detected at block 921, the receiver initiates normal frame reception at a block 923 using the selected satisfactory antenna. If a frame is not detected at block 921, then the receiver returns to block 911 to repeat the process.

As mentioned above, the receiver goes to B to determine the best antenna. At a block 925, the receiver determines whether or not the currently selected antenna is the last antenna to be tested. If not, the receiver selects the next antenna at a block 927, performs an initialization process at a block 929, and attempts preamble clock lock at a block 931. If the receiver does not achieve clock lock, it selects the next antenna. If the receiver achieves clock lock on any particular antenna at block 931, the receiver determines the signal quality of that particular antenna at a block 933, stores it, and loops to block 925.

When the receiver determines that all antennas have been tested, the receiver selects the best signal quality at a block 935 and tests to determine whether the selected signal quality is satisfactory at a block 937. If it is not satisfactory, the receiver goes to A to switch antennas at block 907 and repeat the process of selecting a satisfactory antenna. If the signal quality is satisfactory, the receiver selects the associated antenna at block 939, goes through an initialization process a block 941, and attempts preamble clock lock at a block 943.

If clock lock is not achieved using the antenna having the best signal quality, the next best signal quality is selected at a block 945 and the receiver loops back to block 937. Once clock lock is achieved at block 943, the receiver tests the signal quality of the selected antenna at a block 947. If the signal quality is not satisfactory, the receiver goes to block 945 to select the next best signal quality as discussed above. If the signal quality of the selected antenna is satisfactory at block 947, the receiver goes to C and determines whether the preamble is in its last field at a block 949. If it is not in its last field, the receiver tests whether the signal quality of the selected antenna is satisfactory at a block 951. If the signal quality of the selected antenna is not satisfactory at block 951, the receiver goes to A to repeat the process of selecting a satisfactory antenna. If the signal quality is determined to be satisfactory at block 951, the receiver attempts to detect a frame at a block 953 using the selected antenna. If a frame is detected at block 953, the receiver initiates normal frame reception at a block 955 using the selected antenna. If a frame is not detected at block 953, the receiver returns to block 949 to determine if the preamble is in its last field.

If at any point the receiver determines at block 949 that the preamble is in its last field, the receiver invokes an equalization algorithm at a block 955, and tests at a block 957 to determine whether the signal quality of the selected antenna is satisfactory. If it is not determined to be satisfactory at block 957, the receiver goes to A to repeat the process of selecting a satisfactory antenna. If the signal quality is determined to be satisfactory at 957, the receiver attempts to detect a frame at a block 959 using the selected antenna. If a frame is detected at block 959, the receiver initiates normal frame reception at block 955 using the selected antenna. If a frame is not detected at block 959, the receiver returns to block 957 to monitor the signal quality of the selected antenna.

Figure 10:
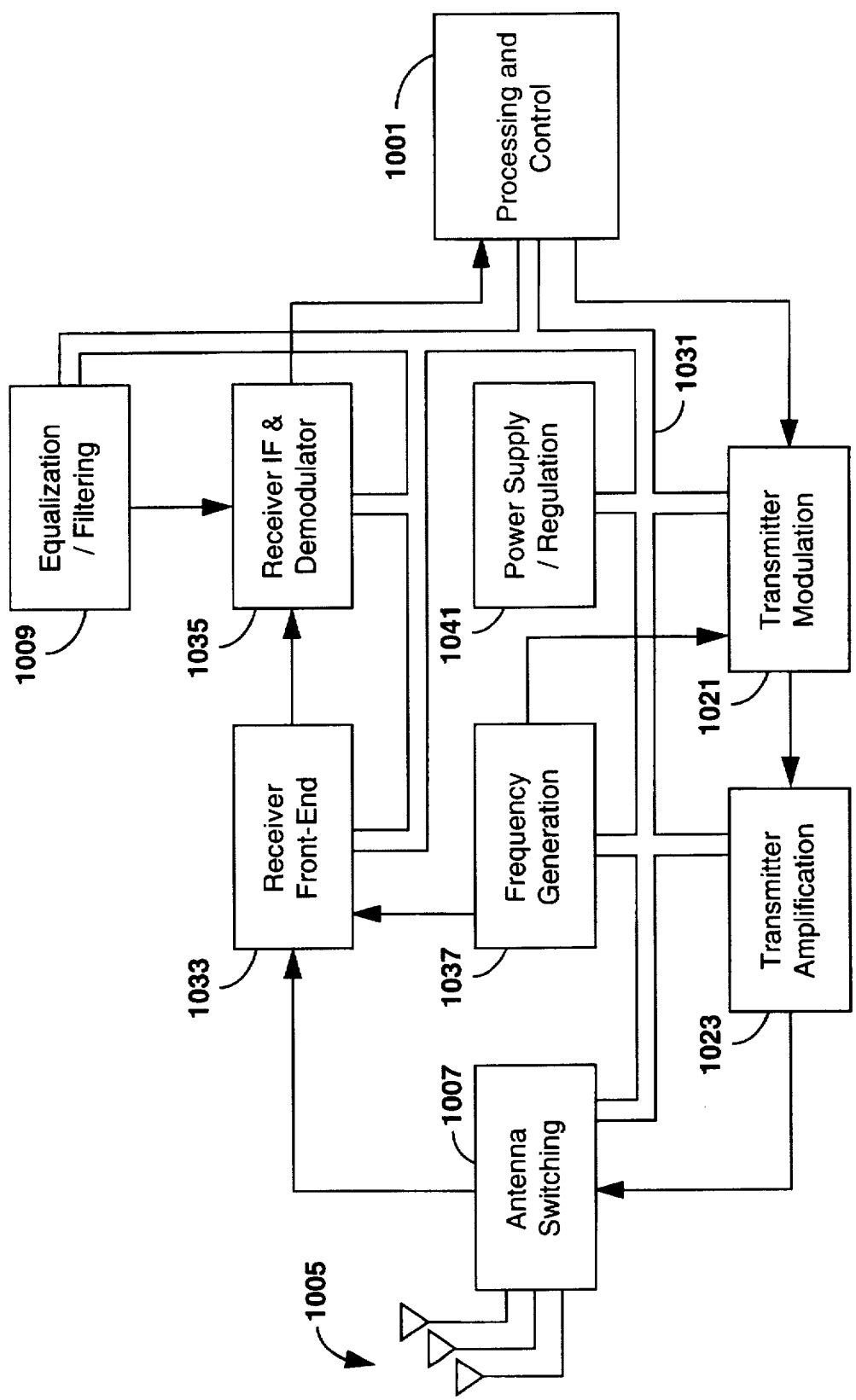
FIG. 10 is a circuit diagram illustrating the transceiver circuitry of a transceiver built in accordance with the present invention, such as the transceivers illustrated in FIG. 1.

FIG. 10 is a circuit diagram illustrating the transceiver circuitry of a transceiver built in accordance with the present invention, such as the transceivers illustrated in FIG. 1. In the transceiver, a processing and control circuit 1001 operates using an antenna diversity protocol to direct the selection of one of a plurality of antennas 1005 (via a switching circuit 1007), while also directing multipath compensation and associated timing thereof (via an equalization circuit 1009). The details of such direction can be found with reference to the description associated with the various flow charts of FIGS. 8a–9c, for example, and need not be repeated.

Generally, the processing and control circuit 1001 controls the transmitter portion of the transceiver, i.e., transmitter modulator and amplification circuits 1021 and 1023, directly via the control bus 1031, and indirectly via the power supply circuit 1041. Similarly, the control circuit 1001 indirectly and directly controls the receiver portion of the transceiver, i.e., the front-end, IF and demodulator, and the equalization circuits 1033, 1035 and 1009, respectively. A frequency generation circuit 1037 is provided to deliver the base frequency to the transmitter modulator 1021 and the receiver front-end 1033.

The illustrated transceiver is typical to current designs with two important exceptions: 1) the receiver IF and demodulator circuit 1035 provides additional recognition circuitry; and 2) the processing and control circuit 1001 utilizes the antenna diversity protocols built in accordance with the present invention. In particular, instead of only having recognition circuitry being able to detect a single preamble sequence and recognition circuitry being able to detect a single unique word, depending on the configuration (see the specific embodiments herein), the circuit 1035 contains recognition circuitry to identify second, third, etc., preamble portions, time stamps, and alternate unique words. The specific recognition circuitry itself is identical to that currently used to detect single preambles and unique words, and, thus, are readily available in the art. Moreover, for specific antenna diversity protocol embodiments, reference is made to the various other FIGS.

Figure 11:
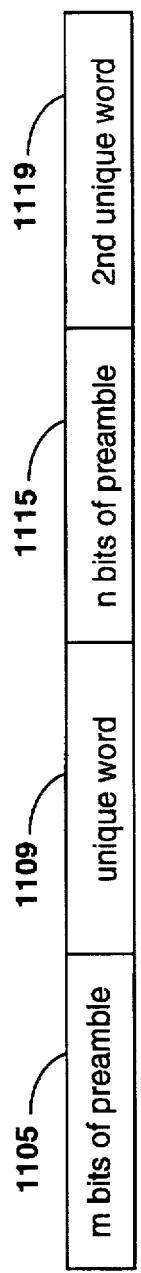
FIG. 11 is a diagram illustrating a preamble bit sequence that has been selectively extended by a receiver that has informed a transmitter of its capability or desire to utilize the additional preamble portions for its antenna diversity protocol.

FIG. 11 is a diagram illustrating a preamble bit sequence that has been selectively extended by a receiver that has informed a transmitter of its capability or desire to utilize the additional preamble portions for its antenna diversity protocol. More particularly, in a network environment wherein most receivers are configured for using only a single preamble bit sequence preceding a unique word, a specially configured receiver may specifically or generally request that all future transmissions utilize an additional preamble portion creating an expanded preamble 1101.

Specifically, for receivers not configured with a recognition circuit to identify the content of a second preamble field 1115, such receivers perform all of their antenna diversity and compensation procedures during a first preamble field 1105. For example, because the receiver cannot tell where in the bit sequence of the field 1105 that it detects a satisfactory antenna, the receiver does not search for a best antenna. Instead, the receiver merely awaits the unique word in a field 1109 which signifies the beginning of the content portion of the communication packet. With such a receiver, i.e., one which is only configured to identify the first preamble field 1105, transmitters never extend the preamble and immediately transmit the content portion of the communication packet after the unique word in the field 1109 is sent.

However, if a receiver is configured with recognition circuitry to identify the content of the second preamble field 1115, that receiver can register its capability with all associated transmitters. As a result, the associated transmitters do extend the preamble 1101 as illustrated by the second preamble field 1115 and a second unique word field 1119. Thus, such a receiver which detects a satisfactory antenna in the first preamble period 1105 can begin a search for a best antenna and invoke an adaptive equalization algorithm during the second preamble period 1115. It can be appreciated that, in such a configuration, the first unique word 1109 constitutes a time stamp. Additionally, it desirable (yet not necessary) that the unique word 1109 and the second unique word 1119 have different bit sequences to prevent a false indication of the beginning of the communication packet content.

Moreover, a so equipped receiver (in a transceiver) might request an extended preamble, such as in a request for poll, poll and acknowledge handshake sequence. For example, the receiver (e.g., within a mobile transceiver) request that a transmitter (e.g., within a stationary transceiver) poll the receiver using the extended preamble. The transmitter responds, for that request or session only, by polling the receiver using the extended preamble. Otherwise, the transmitter polls using the shorter, non-extended preamble for receivers either not so equipped to handle the extended preamble or equipped but not requesting the extended preamble. Alternately, after a specific request to do so, the transmitter can be instructed to continue to use an extended poll whenever communicating with the equipped receiver until requested by that receiver to do otherwise.

Figure 12:
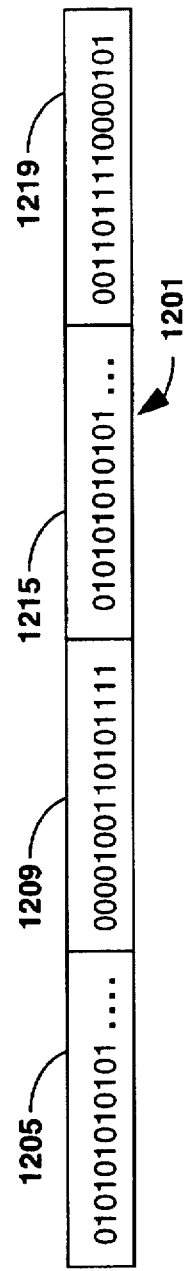
FIG. 12 is a diagram which illustrate a specific embodiment of the preamble bit sequence of FIG. 11 wherein identical first and second portions of the preamble are separated by the first unique word and a second unique word is used to indicate the actual beginning of the remaining portion of a communication packet.

FIG. 12 is a diagram which illustrate a specific embodiment of the preamble bit sequence of FIG. 11 wherein identical first and second portions of the preamble are separated by the first unique word and a second unique word is used to indicate the actual beginning of the remaining portion of a communication packet. In this embodiment, an appropriately configured receiver contains a recognition circuit for identifying a first or a second portion of a preamble contained in corresponding fields 1205 and 1215. In addition, a recognition circuit for identifying a first unique word contained in a field 1209 is required. In addition, a third recognition circuit is necessary for identifying a second unique word (identifiably distinct from the first) as contained in a field 1219.

With this appropriate configuration, the receiver first identifies a satisfactory antenna. Because it cannot determine whether the satisfactory antenna was detected within the field 1205 or within the field 1215, the receiver is forced to listen with the satisfactory antenna to see which unique word happens to be transmitted next. If a first unique word is transmitted, as contained in a field 1209, the receiver (responding to its diversity protocol) concludes that a best antenna search is possible, and begins the search within the field 1215. After selecting the best antenna, the receiver awaits a second unique word. Thereafter, upon encountering the second unique word, as contained in a field 1219, the receiver is warned to prepare to receive the content of the communication packet.

If while listening with a satisfactory antenna to identify which unique word happens to be transmitted the second unique word is detected, the satisfactory antenna is used to receive the content of the communication packet.

Unlike the configuration of FIG. 11, however, in FIG. 12, the first unique word in the field 1209 is only identifiable by receivers capable of receiving the extended preamble. Only the second unique word in the field 1219 is commonly recognizable by all of the receivers. Thus, when a transceiver transmits an non-extended preamble, that preamble consists of the contents of the field 1215 and field 1219. In the extended preamble mode, transceivers extend the preamble by prefacing the contents with the fields 1205 and 1209.

More particularly, upon receiving an extended preamble, each appropriately configured receiver operates as previously described. However, when non-configured receivers (i.e., receivers not capable of utilizing the extended mode) attempt to receive the extended preamble, they first detect a satisfactory antenna. If the satisfactory antenna was detected in the second preamble portion, i.e., in the field 1215, the non-configured receiver continues as it would with any non-expanded preamble by awaiting the unique word in field 1219 which it detects and begins receiving the communication packet content. However, if the satisfactory antenna is detected during the first preamble period in the field 1205, the satisfactory antenna will likely fail upon encountering the first unique word (because the receiver cannot recognize it). As a result, the receiver will repeat the search for a satisfactory antenna during the second preamble period in the field 1215. This time, however, the non-configured receiver using a newly identified satisfactory antenna can detect the second unique word and receive the subsequent communication packet content.

Figure 13:
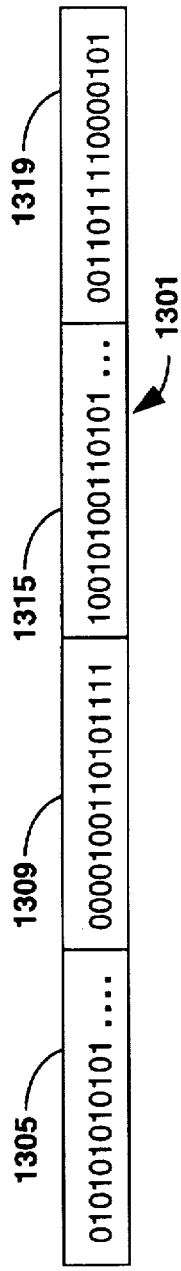
FIG. 13 is a diagram which illustrates another specific embodiment of the preamble bit sequence of FIG. 11 wherein the first portion of the preamble provides a relatively more optimal bit sequence for performing an antenna diversity protocol, while the second portion of the preamble provides a relatively more optimal bit sequence for performing adaptive equalization.
Figure 4:
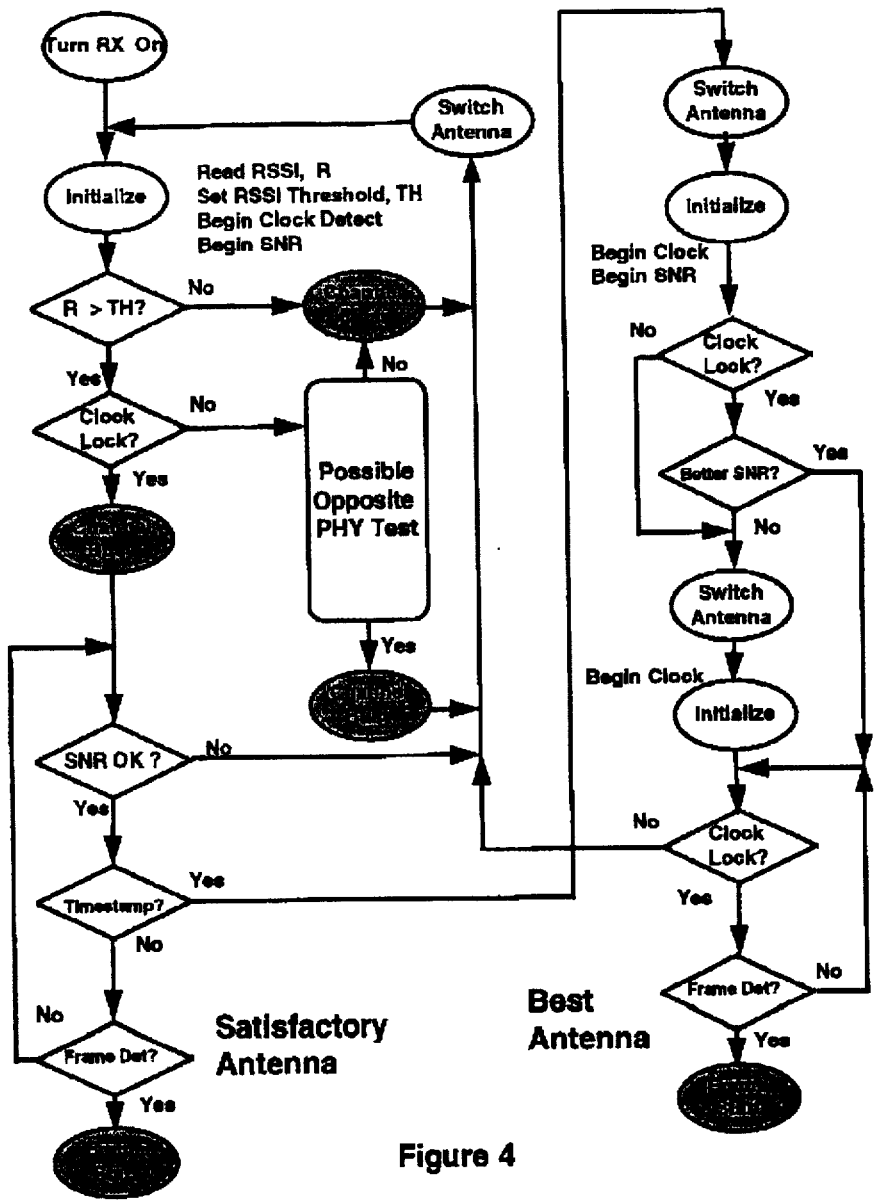

FIG. 13 is a diagram which illustrates another specific embodiment of the preamble bit sequence of FIG. 11 wherein the first portion of the preamble provides a relatively more optimal bit sequence for performing antenna diversity, while the second portion of the preamble provides a relatively more optimal bit sequence for performing adaptive equalization. With exception to the enhanced adaptive equalization possible during the second portion of the preamble, an appropriately configured receiver operates identically to that previously discussed in FIG. 12, and, therefore, need not be repeated.

Similar to their operation in the embodiment illustrated in FIG. 12, non-configured receivers can only detect the second unique word contained in a field 1319, but further can only detect the second preamble content in a field 1315. Thus, any non-configured receiver will not be able to identify the content of fields 1305 and 1309, and, therefore, will effectively ignore them. Instead, the non-configured receivers only detect the latter portion of the extended preamble 1301, and do not know whether the preamble has been extended or not. Thus, with either the extended or the non-extended preamble, the non-configured receiver merely identifies a satisfactory antenna in the field 1315, identifies the unique word in the field 1319, and receives the subsequent communication packet content.

Furthermore, although the preamble illustrations mentioned above illustrate specific field content and numbers of fields, it should be clear in view of the foregoing that alternate content and numbers are all possible depending on a specific users requirements.

In addition, specific reference is made to an Appendix A attached hereto. Constituting further disclosure hereto, the Appendix A is a paper entitled "Preamble Modification for Improved Selection Diversity", by the present inventor, R. Mahany, dated May, 1994. Therein, several alternate embodiments of the present invention are provided which, for example, describe exemplary time periods and bit sequence lengths for DS and FH spread spectrum implementations.

As is evident from the description that is provided above, the implementation of the present invention can vary greatly depending upon the desired goal of the user. However, the scope of the present invention is intended to cover all variations and substitutions which are and which may become apparent from the illustrative embodiment of the present invention that is provided above, and the scope of the invention should be extended to the claimed invention and its equivalents.

APPENDIX A

May 1994  Doc: EE P802.11-94/93

IEEE P802.11
Wireless Access Method and Physical Layer Specification

Preamble Modification for Improved Selection Diversity

Ronald Mahany
Norand Corporation
550 Second Street SE
Cedar Rapids, IA 52401
Telephone: (319)369-3552
Facsimile: (319)369-3299
email: mahanyrl@norand.com

Abstract

The Frequency Hopping and Direct Sequence PHY groups have selected preamble characteristics with the expectation that some 802.11 compliant implementations will use some form of antenna diversity, or some other form of multipath compensation. In both cases, preambles with uniform data content were chosen -- a *dotting pattern* of 1-0-1-0... for FH, and a *marking pattern* of 1-1-1-1... (at the input to the scrambler) for DS. While these uniform patterns meet the basic requirements of receiver synchronization and channel busy detection, they may not be the most appropriate for implementing antenna diversity. Insertion of a time stamp within the preamble is proposed to improve performance of antenna selection diversity algorithms, with potential application to other multipath compensation or channel optimization alternatives as well.

Introduction

A number of papers related to preamble characteristics, synchronization words, clear channel assessment, have been submitted before the FH and DS PHY ad hoc groups. The subject of antenna diversity was discussed in some detail in a recent contribution -- IEEE P802.11-94/70, by Dean Kawaguchi. Document 94/70 provides excellent groundwork for further work in this area. While it was presented within the FH group, its content is not unique to frequency hopping, and concepts presented within should be considered relevant to the DS PHY as well.

The implications of antenna diversity may not have been fully considered when the respective RF PHY groups selected preambles for their PHY headers. This paper is intended to highlight this issue, and offer an alternative that provides more flexibility in addressing this problem.

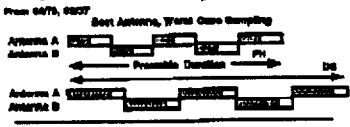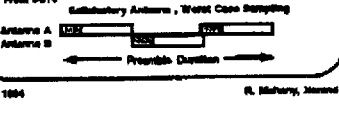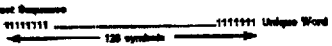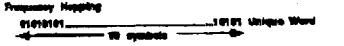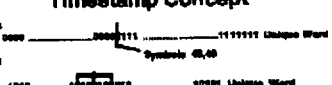

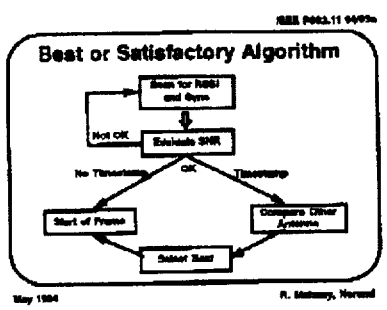
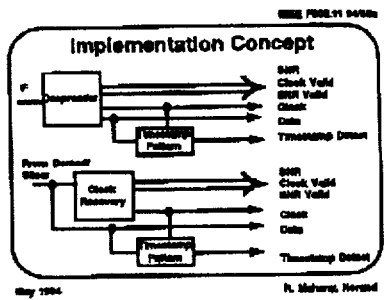
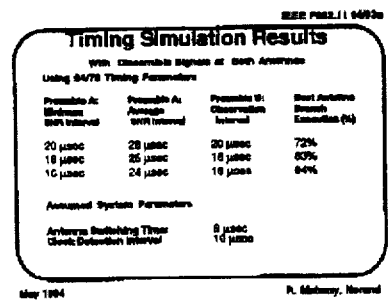
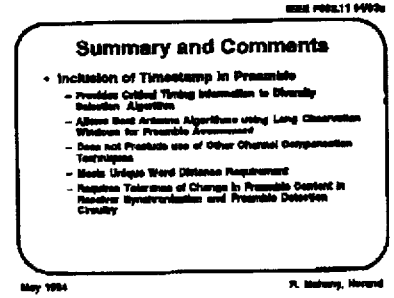

May 1994                                                            Doc.    EE P802.11-94/93

Assumptions:

The discussion of diversity within this paper is based upon a particular view of diversity's place within the standard. The perspective of the author can be summarized in the following list of assumptions.

1. While most contributors who have discussed methods of channel optimization within the working groups tend to focus on two-antenna selection diversity, the standard should not preclude alternatives such as $n$ antenna selection diversity, adaptive equalization, maximum ratio combining, or RAKE approaches for direct sequence. All of these techniques generally benefit from training during the preamble period. The preamble should provide a reasonable amount of flexibility to implement alternative approaches to address the wireless channel.

2. Use of diversity, or any of the alternative methods, is not a requirement of either 802.11 RF PHY. The purpose of including preamble support for them is to provide means for manufacturers whose target customers can benefit from (and will pay for) them to use them, not to dictate use, or mandate algorithms.

3. Because of the broad interest in selection diversity, it is a good litmus test for evaluating whether we have selected satisfactory preambles.

4. CCA and diversity approaches are interrelated, and cognizance of diversity issues is important in specifying CCA detect time, $P_{det}$ and $P_{fa}$ requirements for preamble reception. As a fairness issue, CCA conformance testing must not be specified in a way that favors either diversity, or single antenna implementations.

5. Diversity selection on a per transmission basis is appropriate given the propagation characteristics of the channel, and the boundless variety of potential interference scenarios that need to be considered with like and unlike devices operating in proximity, in an ISM environment. Diversity must be viewed in both noise-limited and interference-limited contexts.

6. Throughput using the foundation MAC protocol, like other LBT protocols, can be expected to be sensitive to increases in transmission overhead. In both FH and DS, PHY overhead exceeds MAC payload for some message types. It is desirable to enable channel compensation techniques within the PHYs, yet it is undesirable to extend preamble length boundlessly to do so. (Note that in the case of DS, PHY overhead is now approaching 200 symbols per packet.)

7. Given the usual implementation constraints, of size, cost, power consumption, etc., anything that can be done at the transmitter to make the receiver's job easier, should be done.

submission                                    page 2                                  R. Mahany, Norand May 1994                                          Doc:   IE P802.11-94/93

Background:

Document 94/70 details two basic classes of two-antenna selection diversity algorithms. The *best antenna* algorithm requires that both antennas be scanned and assessed for signal quality during the preamble period, with the receiver returning to the best antenna with sufficient time remaining in the preamble to attain synchronization prior to the unique word. The *satisfactory antenna* class of algorithm stops scanning as soon an antenna with acceptable signal quality is found.

For asynchronous traffic, the foundation MAC does not provide prior knowledge of frame boundaries, therefore antenna sampling algorithms must consider the worst case timing relationships between start of transmission, and antenna sampling. This results in the preamble period being divided into five sampling periods for the *best antenna* algorithm, and three sampling periods for the *satisfactory antenna* algorithm. These sampling periods, less switching and synchronization times for the receiver, specify an observation window in which to make an assessment of the presence, and/or quality of the received signal.

Frequency Hopping

Discussion of 94/70 -- Noise Limited Channel

The previously approved 80 bit preamble length for FH places severe constraints on the *best antenna* class of algorithms, allowing (after receiver settling time) only eight to ten symbols of preamble for clock synchronization and channel assessment. The antenna selection settling time indicated in 94/70 is realistic, and clock lock within the allotted number of bits within the $P_{det}$, $P_{fa}$ limits indicated is possible under the conditions simulated. However, it is not realistic to expect to make signal quality comparisons between antennas when such a short sampling period is available. This is clearly the case in figure 3 of 94/70, where the simulation shows $P_{fa}$ in noise of 5% to 10%. The $P_{det}$ statistics for the ten-symbol observation window are pretty good, but may substantially degrade if the clock detector bandwidth is widened to contend with multipath induced jitter. More significantly, the ten-symbol observation window $P_{det}$ results in 94/70 were based on a noise-limited channel providing a $1 \times 10^{-5}$ BER. $P_{det}$ at lower channel BER is also important, if the ability to detect clock is to be used as a means of comparing two or more antennas. With short observation windows, measurable $P_{det}$ will be attained at poor channel bit error rates that will not sustain payload transfer. Detection of clock alone cannot be used with certainty to determine the best antenna.

The *best antenna* algorithms in figures 5 and 6 of 94/70 implicitly recognize the detection uncertainty issue, and attack it by requiring clock lock to initially ascertain presence of desired signal, then using energy in band (RSSI) comparisons to determine the best antenna. With the preamble length and content already selected, there aren't many degrees of freedom. Given these constraints, the illustrated algorithms do as well as any in solving the problem for the noise limited case.

May 1994  Doc EE P802.11-94/93

Discussion of 94/70--Interference Limited Channel

The weaknesses of energy-based antenna selection have been discussed previously within the PHY ad hoc groups. Even within the noise-limited case, there are issues with using RSSI for determining best antenna. The difference in signal strength between a $1 \times 10^{-3}$ channel and a $1 \times 10^{-5}$ channel is two to three dB. This places a burden on RSSI measurement accuracy.

Document 94/70 did not address detection performance in the presence of interference. The C/I limited case is similar to the C/N limited case--short observation windows introduce more detection uncertainty. Again, within short windows, clock will be detected in interference limited channels with unsatisfactory BER. In this case, RSSI based decisions can result in the wrong antenna being selected, since using RSSI optimizes for C+I, not C/I or pre-detection SNR. (The FH PHY chairman's immortal example of locking to the strongest microwave comes to mind.)

It is clearly desirable to use the longest observation window possible for channel characterization. This provides better detection certainty, and potentially allows qualitative, SNR based antenna selection algorithms. Low modulation index FM is known to have substantial intrinsic jitter that must be averaged out. Interference and multipath induced jitter complicate this problem, again requiring longer observation windows to make comparative measurements. Personal experience with clock recovery for discriminator demodulated GMSK, at similar data rate and BT to that of the draft standard GFSK modulation, indicated that about 20 bits of transitions are needed to obtain a useful indication of recovered SNR. This appears to be reasonably consistent with the low uncertainty in the 20μsec window clock detector simulation statistics in figure 3 of 94/070.

Truncated Preambles

Antenna selection algorithms also need to function in cases where some of the beginning of the preamble is obscured on both antennas by interference, or the end of another transmission. The five-window, best antenna scheme is extremely vulnerable in this case, and will frequently miss transmissions that single antenna systems will receive.

Direct Sequence Issues

While 94/70 was not presented in the context of the direct sequence PHY, there are significant parallels between FH and DS selection diversity requirements. The *best antenna* algorithm in 94/70 is similar to that discussed in a DS context in 93/37. DS diversity algorithms must also contend with noise limited, interference limited, and truncated preamble cases.

For DS, acquisition and clock detection are a combined process, and $P_{det}$, $P_{fa}$ are replaced by $P_{acq}$, $P_{false\ acq}$. Like their FH counterparts, DS receivers will acquire and track signal under low BER conditions unsuitable for data transfer. In general, it can be expected that DS receivers will take longer than FH receivers to acquire signal each time an antenna is selected, but a shorter period to evaluate the received signal after acquisition. The approved 128 bit preamble for DS is about 50% longer than that for FH. The difference in preamble length between the two PHYs is necessary to account for the incremental requirements of DS synchronization (AGC May 1994 Doc: EE P802.11-94/93 training, code acquisition, scrambler flushing, etc.), and may already reflect a perceived need within the DS community for longer observation periods for acceptable preamble detection performance The *best antenna* algorithm of 94/70 could be applied directly in the DS case, using pre-despreader signal strength measurement to compare antennas, if a quick measurement is desired. Alternatively, post-despreader signal quality estimation may be performed readily in a DS receiver, e.g., as the measure of correlated to uncorrelated energy at the despreader output, integrated over several adjacent bit intervals. Some of the implementation issues differ, but the choice of *best antenna* vs. *satisfactory antenna* approaches for DS is the same conceptually, as it is for FH.

An Alternative Preamble Concept

Preamble length, asynchronicity between antenna scanning and start of transmission, and antenna switching time dictate the duration of preamble observation windows. As stated in the assumptions, it is undesirable from an overall system performance standpoint to make the preamble any longer. It is also not possible to reduce antenna switching time below some minimum number of symbol times for either DS or FH PHYs.

The one area where is some recourse, is in reduction of the timing ambiguity between antenna scanning and start of message. With the currently specified uniform preambles in both PHYs, a receiver, synchronizing to preamble for the first time, has no knowledge of whether it has synchronized to the first bits of the preamble, the center, or the end. The worst possible timing relationship between start of transmission and antenna sampling must be assumed in designing switching algorithms. For example, in the best case, where antenna scanning and start of transmission happen to coincide, the *best antenna* algorithm requires only two or three observation periods to make a decision, not five. Each period could be longer increasing confidence in the information obtained. The assumption of worst case timing can be eliminated by the giving the receiver diversity algorithm more information. This information can easily be inserted into the preamble as a timestamp, as shown in figure 1. The timestamp information can be used to facilitate a hybrid *best or satisfactory* (BOS) diversity algorithm.

A proposed timestamped preamble for frequency hopping is shown in figure 2. It consists of 32 bits of alternating 1-0 followed by 48 bits of 0-1. The time stamp is centered at the boundary between bits 32 and 33. It can be easily distinguished by simple pattern recognition circuits keyed to 1001 (distance 2, from preamble) or 010010 (distance 3 from preamble). This preamble represents minimal departure from the current FH PHY dotting pattern preamble.

The proposed timestamp for direct sequence is shown in figure 3. DS differs from FH, in that clock can be extracted directly from the despreader, eliminating the need for transitions in the data for timing recovery. The preamble below would be scrambled to provide spectral whitening, per the DS PHY draft.

May 1994                                           Doc. EE P802.11-94/93

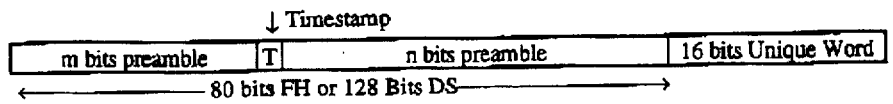

Figure 1: Timestamp Concept

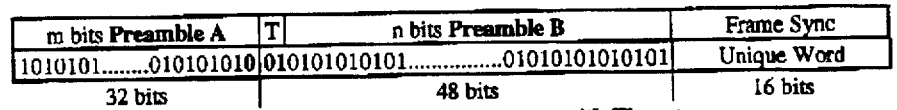

Figure 2: Proposed FH Preamble with Timestamp

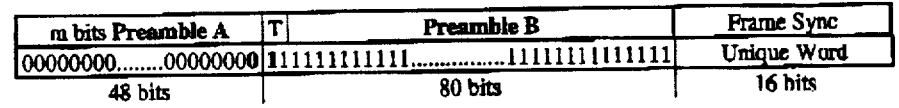

Figure 3: Proposed DS Preamble with Timestamp

An SNR based *Best or Satisfactory* (BOS) Diversity Algorithm Example

The flow chart in figure 4 illustrates a possible application of the timestamp in a hybrid algorithm improve selection diversity performance. For comparative purposes, it is modelled in the context of frequency hopping. This is an adaptation of figure 4 of 94/70. Assumed system parameters, illustrated in Figure 5, were also selected for consistency with 94/70. Also, the flow chart assumes a circuit implementation with continuously available clock lock and SNR outputs. In other words, once clock lock and SNR outputs are valid, their status is updated continuously until the detection circuits are reinitialized.

| Parameter: | Value | Notes |
|---|---|---|
| Antenna Switching Time: | 8 μsec | |
| SYNC (Clock) Detect Observation Interval: | 10 μsec | |
| Minimum Length SNR Observation Interval until SNR valid: | 20 μsec | (Concurrent with SYNC detect) |
| RSSI Threshold | Arbitrary | |

Figure 5 Assumed System Switching and Detection Parameters

May 1994  Doc.  EE P802.11-94/93

Operation

This algorithm is presented in the context of the frequency hopping PHY in accordance with 94/70. Like those in 94/70 it is intended as an example of an appropriate algorithm, not as a requirement for conformance with the standard.

Operational Description

A) The receiver will switch antennas at intervals = Switching time + SYNC detect until a signal exceeding the RSSI threshold is detected. Using the system parameters indicated, switching occurs at increments of 18µs per antenna.

B) Presence of energy and absence of clock may trigger an opposite PHY test if required by the standard.

C) A receiver detecting clock for the duration of the Sync observation period will cease switching, and monitor the selected antenna until either:

1) SNR on the selected antenna is determined to be unacceptable. The antenna is rejected, and the receiver switches to the other antenna.

2) SNR is determined to be acceptable. The receiver continues to monitor the selected antenna. The framing word is received and normal frame reception is initiated. In this case the preamble was initially detected too late in the preamble period to detect the timestamp, so the current (satisfactory) antenna was selected.

Note that in cases (1) and (2), the timestamp may have occurred within the SNR monitoring interval. Clock recovery and SNR assessment circuitry must be tolerant of this change in preamble content, so that it is not construed as clock loss or poor SNR. *A timestamp transition occurring prior to [SNR valid] is ignored.*

3) SNR is acceptable and a timestamp is received after the SNR monitoring interval. The algorithm switches antennas and evaluates recovered SNR through the second antenna. If the first antenna provides better SNR, the receiver will return to the first antenna. Using six-symbol timestamp pattern recognition, the second antenna is selected at symbol 36 in the preamble. Allotting 8 µsec for antenna switching, the second antenna is evaluated over symbols 44 through 64, and if necessary, the receiver returns to the first antenna by symbol 72. This leaves a short period (8 symbols) for bit Sync prior to the framing word, if a switch back to the first antenna is required.

Best Antenna Selection--Timing Analysis:

There are three cases to consider when evaluating the value of the preamble timestamp in a two antenna, selection diversity implementation. The first, with no signal present at either antenna, is May 1994                     Doc. EE P802.11-94/93 trivial. The remaining two are more interesting, and have been evaluated using a sliding window timing analysis to test the potential benefit of the timestamp. These cases are:

- Signal is discernible on one antenna, but not the other.

In this case, the algorithm selects the satisfactory antenna, as expected. For the specified timing parameters, a sufficient portion of Preamble A to execute the *best antenna* branch of the flow chart for 36% of the timing relationships between sampling and start of transmission. After detecting the timestamp and switching antennas, failure to detect clock on the other antenna causes a rapid return to the original antenna prior to the framing word. For the other 64% of cases, the *satisfactory* branch of the algorithm is used.

- Signal is discernible on both antennas.

The results of the sliding window analysis for 8µs switching times, and various observation windows is summarized in the table of figure: 6.

| Preamble A: Minimum SNR Interval | Preamble A: Average SNR Interval | Preamble B: Observation Interval | Best Antenna Branch Execution Percentage |
|---|---|---|---|
| 20 µsec | 26 µsec | 20 µsec | 72% |
| 18 µsec | 25 µsec | 18 µsec | 83% |
| 16 µsec | 24 µsec | 16 µsec | 94% |

Figure 6   Best Antenna Selection Vs. Observation Time

Note that these results, do not include the effects of less than ideal clock $P_{det}$, $P_{fa}$ statistics, in imperfect SNR comparisons. Shortening the SNR observation window improves the likelihood that the best antenna branch will be executed, but also increases the possibility of making a wrong decision based on imperfect detection. Even with pessimistic assumptions about detection performance, the presence of the timestamp allows best antenna selection a significant majority of the time, while still allowing the longer observation windows of the *satisfactory* class of algorithm in 94/70.

Other Implications:

Specific Issues with DS

With appropriate modifications, the sample algorithm can be applied to direct sequence. DS systems are capable of SYNC recovery and signal quality estimation independently of data content. This has been recognized in proposing a SPACE/MARK transition as a timestamp boundary for DS. In FH, the timestamp boundary must be observed to ascertain the time remaining until the unique word. In DS, it is possible to determine that the timestamp has not yet occurred based on data content. This allows modifications to the sample algorithm to switch May 1994 antennas prior to the timestamp boundary if signal quality determination is completed early. For the 128 symbol DS preamble, a timestamp boundary at the seventh octet is appropriate. Based on certain assumptions of DS acquisition performance, it is conceivable that use of a timestamp and BOS algorithm could allow reduction in the DS preamble length of four octets, should the DS PHY group feel that sufficient system performance gains would result.

Unique Word Recognition -- Distance Requirements

The preamble with timestamp maintains required distances from the FH and DS unique words. For the case of FH, the alternative unique word (frame Sync) of 94/49 is a slightly better alternative for the particular time stamp illustrated in figure 2A. The unique word in 93/209r provides a worst case distance of 5 with the preamble containing the time stamp, the proposal in 94/49 has a worst case distance of 6.

CCA -- Preamble Detection

A CCA requirement based on this type of algorithm might require CCA on preamble within two switching periods, and two clock detect windows, for a total of 36 µs for FH. Alternatively, 18 µs would provide detection on one antenna. This approach can be applied to DS as well with the appropriate timing.

Bit Errors During the Preamble

Bit errors in the preamble may create a false timestamp. Using the suggested combination of 6 symbols for FH (preamble bits: 30,31,32,33,34,35 in figure 2) requires 3 bit errors for this to occur. This is not catastrophic, and has the desired effect of instructing the receiver to switch antennas to avoid channel errors. The DS preamble timestamp can make additional use of the fact that the preamble content changes completely at the timestamp boundary. Errors in preamble content during either the Preamble A or Preamble B period can be used as an indication to switch antennas.

Truncated Preamble

Interference obscuring the early part of the preamble on both antennas can be expected to occur occasionally, due to classical hidden node problems, and burst interference sources. Note that this is potentially catastrophic for the *best antenna* algorithm in 94/70. The sample algorithm illustrated here, and the *satisfactory antenna* algorithm in 94/70 will usually catch the frame Sync word with better than 50% of the beginning of the preamble obliterated.

Impact on Single Antenna, Non Diversity Implementations

The presence of the timestamp should not be disruptive to single antenna implementations. If a particular clock synchronizer cannot cope with the apparent clock slip introduced in the timestamp, there is substantial opportunity for clock synchronization after the time stamp is received.

May 1994                                      Doc: IE P802.11-94/93

Implementation of the Sample Algorithms of 94/70, or Others

Presence of a timestamp as illustrated in figure 2A does not preclude implementation of the algorithm types described in 94/70, or a variety of other algorithms. The only constraint on these implementations is that clock detection must be tolerant of the change in preamble content at the timestamp boundary. It is anticipated that $P_{fa}$ for the noise only case will increase slightly, since a larger number of noise patterns will correlate with allowed preamble content.

Impact on Alternative Channel Compensation Methods

Techniques such as equalization and maximum ratio combining will generally rely on the transition content and timing in the FH preamble. The proposed timestamp results in the loss of a single transition, which should not be significant. For DS, RAKE and equalization approaches can be implemented using correlation only, without consideration of data content. The availability of time information within the preamble can be used to advantage in both PHYs in implementing these alternatives.

Alternative Preambles For FH

Figures 7A and 7B provide alternatives where additional timestamp information can be extracted from preamble content. This provides FH with the same advantage that the DS preamble content provides--preambles A and B can be differentiated before or after the timestamp – at the expense of fewer transitions for clock recovery. Because of their substantial departure from the presently approved FH preamble, the impact of switching to these preamble types requires more assessment before they are proposed for serious consideration.

| m bits Preamble A | T | n bits Preamble B | Frame Sync |
|---|---|---|---|
| 1010....................1010 | | 110011001100..................110011001100 | Unique Word |
| 32 bits | | 48 bits | 16 bits |

Figure 7A

| m bits Preamble A | T | n bits Preamble B | Frame Sync |
|---|---|---|---|
| 0110....................0110 | | 010101010101..............01010101010101 | Unique Word |
| 32 bits | | 48 bits | 16 bits |

Figure 7B

May 1994                                                                 Doc: EE P802.11-94/93

Conclusions

Addition of a timestamp to the respective PHY preambles can be generally beneficial to selection diversity algorithms. The illustrated example shows one method of applying the timestamp. Inclusion of the timestamp does not preclude, and may benefit other diversity algorithms or alternative channel compensation approaches.

References:

IEEE Doc P802.11-93/37, "Proposal for 2 Mbit/s DSSS PHY", Jan Boer

IEEE Doc P802.11-93/209r "Preamble Proposal for 2.4 GHz Frequency Hop Standard (With Revisions)", Jim McDonald IEEE Doc P802.11-94/49 "Unique Word Proposal for the 802.11 PHY Preamble", Naftali Chayat IEEE Doc P802.11-94/70 "Carrier Sense with Diversity Model for FH PHY", Dean Kawaguchi

What is claimed is:

1. A method for use in a communication network having a transmitter and a receiver that each have a separate housing, the receiver having a plurality of antennas, the transmitter and the receiver using a preamble of a communication packet to facilitate an antenna diversity protocol in the receiver, said method comprising the steps of:

(a) transmitting by the transmitter a first bit sequence of a preamble;

(b) transmitting by the transmitter a time stamp bit sequence of the preamble, the time stamp bit sequence identifiably distinct from the first bit sequence of the preamble, the time stamp bit sequence of the preamble being identifiable by the receiver for use in an antenna diversity protocol;

(c) transmitting by the transmitter a second bit sequence of the preamble; and (d) transmitting by the transmitter the remainder of the communication packet.

2. The method of claim 1 further comprising, after the step of transmitting by the transmitter a time stamp bit sequence of the preamble, the step of attempting, by the receiver, to select a best antenna from the plurality of antennas for receipt of the remainder of the communication packet if the time stamp bit sequence is successfully received by the receiver.

3. A method for use in a communication network having a transmitter and a receiver that each have a separate housing, the receiver having a plurality of antennas, the transmitter and the receiver using a preamble of a communication packet to facilitate an antenna diversity protocol in the receiver, said method comprising the steps of:

(a) beginning to transmit, by the transmitter, a first bit sequence of a preamble, the first bit sequence being identifiable by the receiver for use in an antenna diversity protocol;

(b) after transmission of the first bit sequence has ended, beginning to transmit, by the transmitter, a second bit sequence of the preamble, the second bit sequence of the preamble identifiably distinct from the first bit sequence of the preamble, the second bit sequence being identifiable by the receiver for use in the antenna diversity protocol; and (c) after transmission of the second bit sequence has ended, transmitting, by the transmitter, the remainder of the communication packet.

4. The method of claim 3 further comprising, after the step of beginning to transmit by the transmitter a first bit sequence of a preamble, the step of attempting, by the receiver, to select a best antenna from the plurality of antennas for receipt of the remainder of the communication packet if the first bit sequence is successfully identified by the receiver.

5. The method of claim 4 further comprising, after the step of beginning to transmit by the transmitter a second bit sequence of the preamble, the step of accepting, by the receiver, a satisfactory antenna from the plurality of antennas for receipt of the remainder of the communication packet if the first bit sequence is not successfully identified by the receiver.

6. A method for use in a communication network having a transmitter and a receiver that each have a separate housing, the receiver having a plurality of antennas, the transmitter and the receiver using a preamble of a communication packet to facilitate an antenna diversity protocol in the receiver, said method comprising the steps of:

(a) beginning to transmit, by the transmitter, a first of a plurality of preamble portions, each preamble portion being distinguishable from the other of the plurality of preamble portions by the receiver for use in an antenna diversity protocol;

(b) after transmission of the preamble portion, beginning to transmit, by the transmitter, another one of the plurality of preamble portions;

(c) branching to step (b) if other of the plurality of preamble portions have not yet been transmitted; and (d) transmitting, by the transmitter, the remainder of the communication packet.

7. The method of claim 6 further comprising, after the step of transmitting by the transmitter one of a plurality of preamble portions, the step of attempting, by the receiver, to select a best antenna from the plurality of antennas for receipt of the remainder of the communication packet if the first preamble portion transmitted is successfully identified by the receiver.

8. The method of claim 6 wherein the receiver uses an observation window to carry out the antenna diversity protocol, further comprising, after the step of transmitting by the transmitter one of a plurality of preamble portions, the step of lengthening, by the receiver, the observation window for use in the antenna diversity protocol if the first preamble portion transmitted is successfully identified by the receiver.

9. The method of claim 7 further comprising, after the step of beginning to transmit by the transmitter another one of the preamble portions, the step of beginning to perform adaptive equalization, by the receiver, if the antenna diversity protocol has completed antenna selection.

10. The method of claim 7 further comprising, after the step of beginning to transmit by the transmitter another one of the preamble portions, the step of accepting, by the receiver, a satisfactory antenna from the plurality of antennas for receipt of the remainder of the communication packet if both the one of the preamble portions is the last of the plurality of preamble portions to be transmitted, and no previously transmitted preamble portions were successfully identified by the receiver.

* * * * *